KNOCKDOWN COUNTER MERCHANDISING AND STORAGE UNITS

Filed May 19, 1961 15 Sheets-Sheet 1

INVENTORS.
EDWARD M. LEVY
PERRY SWAN
DALE R. LOPATKA
By Prangley, Baird, Clayton, Miller & Vogel
Att'ys.

KNOCKDOWN COUNTER MERCHANDISING AND STORAGE UNITS

Filed May 19, 1961 15 Sheets-Sheet 2

INVENTORS.
EDWARD M. LEVY
PERRY SWAN
DALE R. LOPATKA
By Prangley, Baird, Clayton, Miller & Vogel
Att'ys.

Feb. 16, 1965 E. M. LEVY ETAL 3,169,810

KNOCKDOWN COUNTER MERCHANDISING AND STORAGE UNITS

Filed May 19, 1961 15 Sheets-Sheet 3

INVENTORS:
EDWARD M. LEVY
PERRY SWAN
DALE R. LOPATKA

By Prangley, Baird, Clayton, Miller & Vogel
Att'ys.

Feb. 16, 1965 E. M. LEVY ETAL 3,169,810

KNOCKDOWN COUNTER MERCHANDISING AND STORAGE UNITS

Filed May 19, 1961 15 Sheets-Sheet 4

INVENTORS:
EDWARD M. LEVY
PERRY SWAN
DALE R. LOPATKA

By Brangley, Baird, Clayton, Miller & Vogel
Att'ys.

KNOCKDOWN COUNTER MERCHANDISING AND STORAGE UNITS

Filed May 19, 1961 15 Sheets-Sheet 5

INVENTORS:
EDWARD M. LEVY
PERRY SWAN
DALE R. LOPATKA
By Prangley, Baird, Clayton, Miller & Vogel
Att'ys.

Feb. 16, 1965 E. M. LEVY ETAL 3,169,810

KNOCKDOWN COUNTER MERCHANDISING AND STORAGE UNITS

Filed May 19, 1961 15 Sheets-Sheet 6

INVENTORS:
EDWARD M. LEVY
PERRY SWAN
DALE R. LOPATKA

By Prangley, Baird, Clayton, Miller & Vogel
Attys.

KNOCKDOWN COUNTER MERCHANDISING AND STORAGE UNITS

INVENTORS:
EDWARD M. LEVY
PERRY SWAN
DALE R. LOPATKA
By: Prangley, Baird, Clayton, Miller & Vogel
Att'ys.

KNOCKDOWN COUNTER MERCHANDISING AND STORAGE UNITS

Filed May 19. 1961 15 Sheets-Sheet 8

INVENTORS:
EDWARD M. LEVY
PERRY SWAN
DALE R. LOPATKA

By Prangley, Baird, Clayton, Miller & Vogel
Att'ys.

INVENTORS.
EDWARD M. LEVY
PERRY SWAN
DALE R. LOPATKA
By Prangley, Baird, Clayton, Miller & Vogel
ATT'YS.

KNOCKDOWN COUNTER MERCHANDISING AND STORAGE UNITS

Filed May 19. 1961 15 Sheets-Sheet 10

INVENTORS:
EDWARD M. LEVY
PERRY SWAN
DALE R. LOPATKA
By. Prangley, Baird, Clayton, Miller & Vogel
Att'ys.

INVENTORS:
EDWARD M. LEVY
PERRY SWAN
DALE R. LOPATKA
By Prangley, Baird, Clayton, Miller & Vogel
Att'ys.

INVENTORS:
EDWARD M. LEVY
PERRY SWAN
DALE R. LOPATKA
By Prangley, Baird, Clayton, Miller & Vogel
Att'ys.

KNOCKDOWN COUNTER MERCHANDISING AND STORAGE UNITS

INVENTORS:
EDWARD M. LEVY
PERRY SWAN
DALE R. LOPATKA
By Prangley, Baird, Clayton, Miller & Vogel
Attys.

KNOCKDOWN COUNTER MERCHANDISING AND STORAGE UNITS

Filed May 19. 1961 15 Sheets-Sheet 14

INVENTORS:
EDWARD M. LEVY
PERRY SWAN
DALE R. LOPATKA

By.
Prangley, Baird, Clayton, Miller & Vogel
Att'ys.

KNOCKDOWN COUNTER MERCHANDISING AND STORAGE UNITS

INVENTORS:
EDWARD M. LEVY
PERRY SWAN
DALE R. LOPATKA
By Brangley, Baird, Clayton, Miller & Vogel
Attys.

3,169,810
KNOCKDOWN COUNTER MERCHANDISING AND STORAGE UNITS

Edward M. Levy, Evanston, Perry Swan, Chicago, and Dale R. Lopatka, Glenview, Ill., assignors to Reflector-Hardware Corporation, Melrose Park, Ill., a corporation of Illinois Filed May 19, 1961, Ser. No. 111,371
21 Claims. (Cl. 312—140.1)

The present invention relates to an improved display unit, and more particularly to an improved knockdown counter merchandising and storage unit.

The knockdown counter unit of this invention is of the general type that is useful for the storage of merchandise at counter level or several counter levels and for above the counter displays of merchandise. Such a counter unit may be moved or shifted within a store as displays of merchandise are revised or changed and in certain preferred uses the counter unit may even be shipped from store to store within a city or even across country for exhibitions and the like. Accordingly, the counter unit must not only be practical and serviceable for its primary use, namely the display of merchandise, but it preferably also should be readily movable and shipable. More specifically, in regard to the use of the display unit for display purposes, it must be sturdy, attractive in appearance, and capable of displaying the merchandise thereon in an effective manner. In regard to the moving and shipping of the display unit, workmen must be able to assemble and disassemble the display unit quickly and easily and with minimum tools and the disassembled counter unit must be capable of being placed in a compact form or container for storage and shipment.

Accordingly, it is an important object of the present invention to provide an improved knockdown counter unit which can be more readily assembled and disassembled.

Another object of the invention is to provide a knockdown counter unit which can be assembled and disassembled without the use of tools, all of the parts of the counter unit interfitting to form a self-supporting structure requiring no additional fastening members for assembly and use.

Still another object of the invention is to provide in a knockdown counter unit of the type set forth an improved sliding door structure in combination with merchandise storage facilities therein.

Yet another object of the invention is to provide an improved above-the-counter display in combination with a counter unit of the type set forth.

Still another object of the invention is to provide in a counter unit of the type set forth an improved well top counter.

A further object of the invention is to provide in a counter unit of the type set forth an improved stepped top counter.

A still further object of the invention is to provide a knockdown counter system in which a relatively few basic parts can be provided and assembled to form a wide variety of counter units having different sizes, heights, decor and the like.

Further features of the invention pertain to the particular arrangement of the elements of the knockdown counter unit, whereby the above-outlined and additional operating features thereof are attained.

The invention, both as to its organization and method of operation, together with further objects and advantages thereof, will best be understood by reference to the following specification taken in connection with the accompanying drawings, in which.

Figures 1, 2:
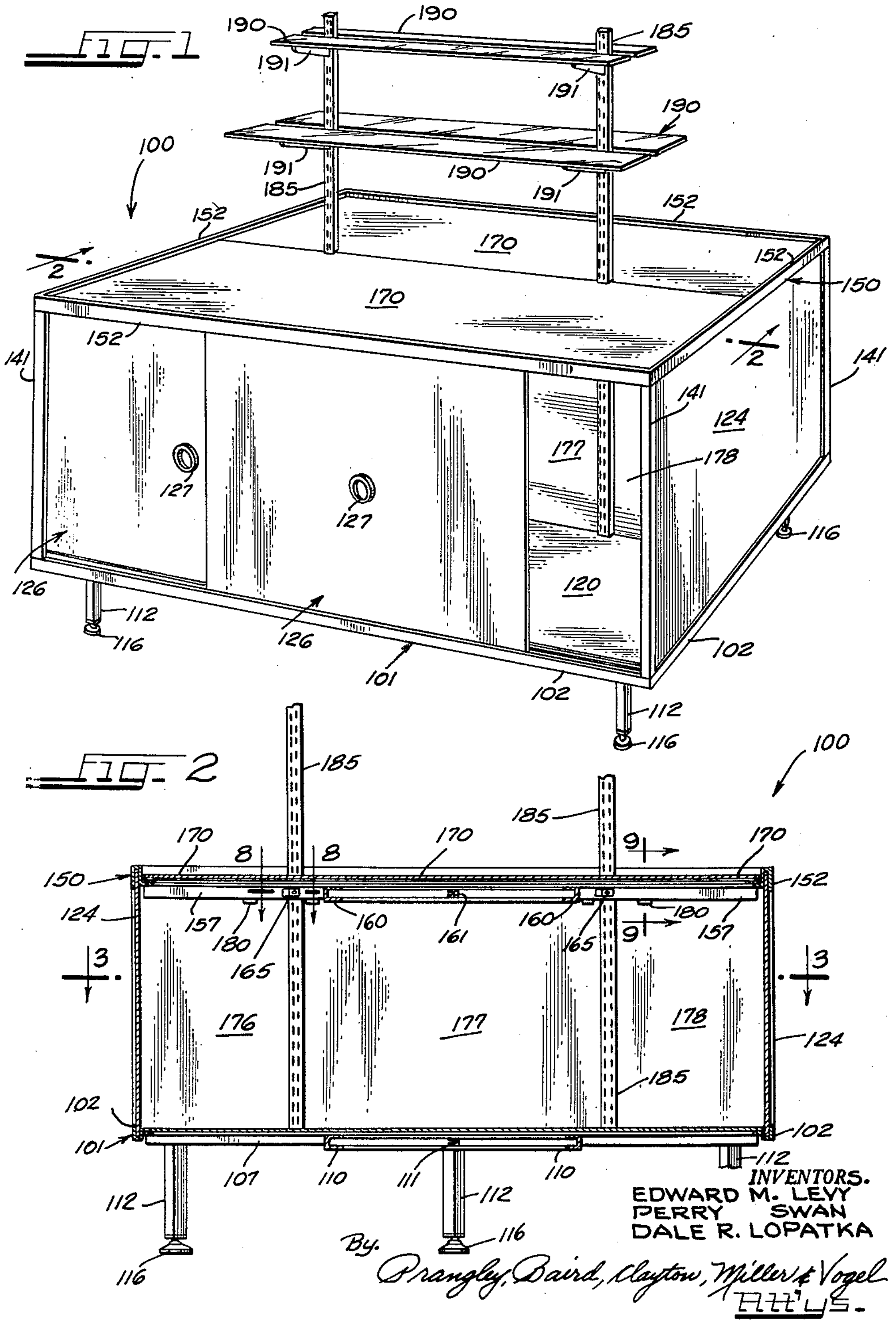
FIGURE 1 is a perspective view of one preferred embodiment of a knockdown counter unit made in accordance with and embodying the principles of the present invention.
FIG. 2 is a fragmentary view in vertical section through the counter unit of FIG. 1 along the line 2—2 thereof.
Figure 3:
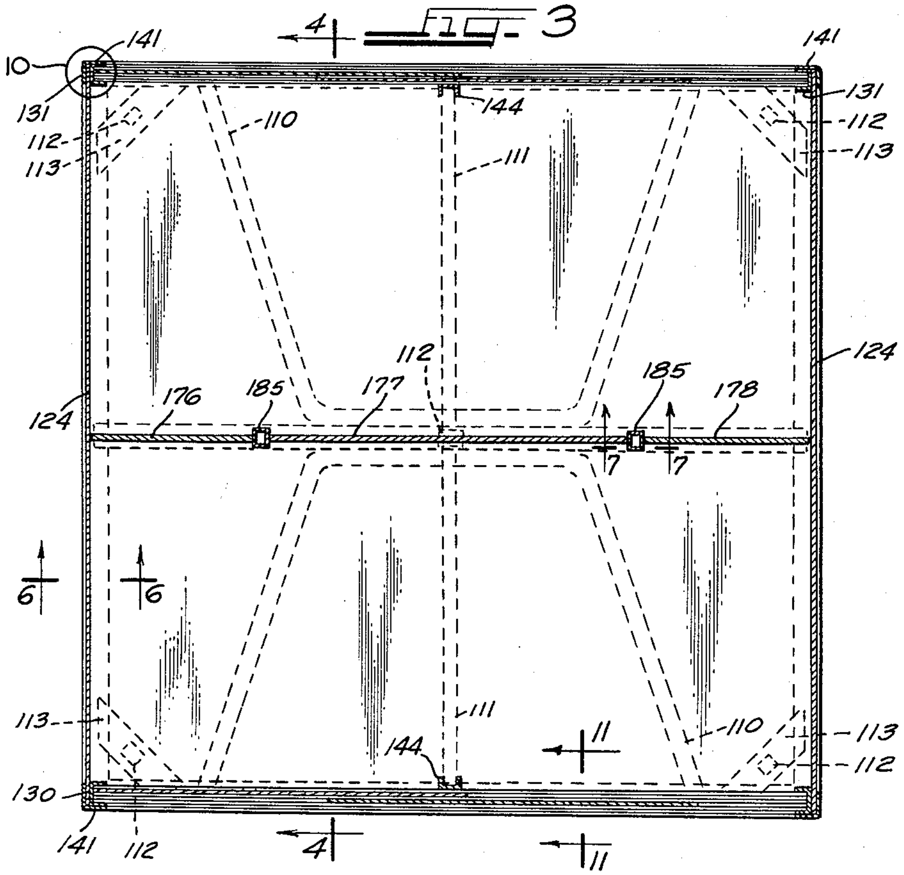
FIG. 3 is a view in horizontal section along the line 3—3 of FIG. 2.
Figure 4:
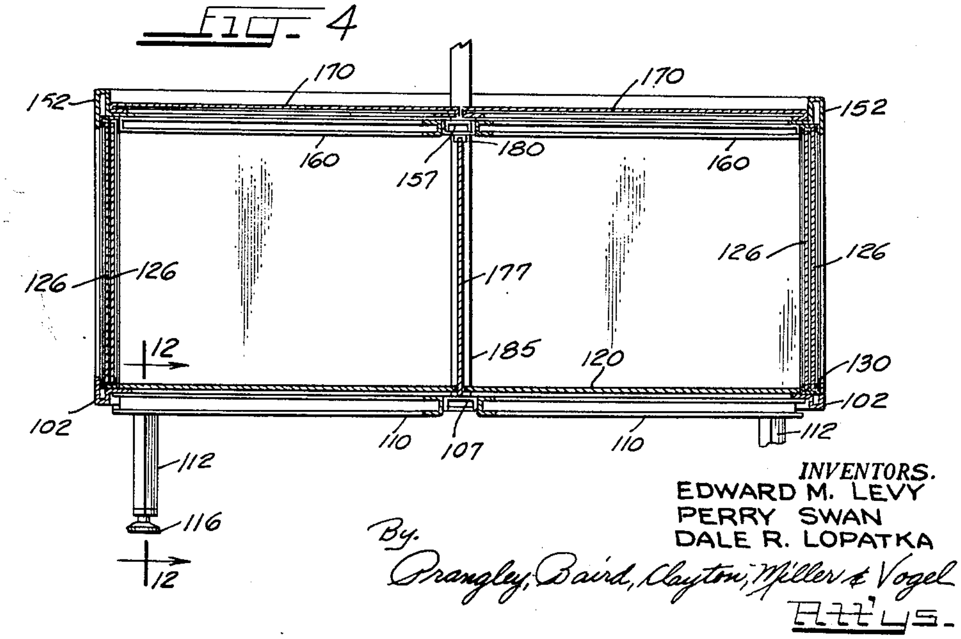
FIG. 4 is a view in vertical section along the line 4—4 of FIG. 3.

Referring to FIGS. 1 to 12 of the drawings, there is shown therein a knockdown counter merchandising and storage unit generally designated by the numeral 100 and made in accordance with and embodying the principles of the present invention, the counter unit 100 generally comprising a base frame 101, a pair of bottom panels 120, a pair of side panels 124, four sliding doors 126 received in two door frames 130, a top frame 150, a pair of top panels 170, three divider panels 176, 177 and 178, four clips 180, and two uprights 185 carrying above the counter display shelves 190.

The base frame 101 is generally rectangular in shape (see FIG. 5) and includes four rigid metal channels 102 integrally joined at the corners as by welding. From FIG. 12 of the drawings it will be seen that each channel 102 is upwardly opening and includes an outer vertical wall 103, a generally horizontal lower wall 104 and an inner vertical wall 105 disposed generally parallel to the wall 103, but terminating below the upper edge thereof, and having a support flange 106 integral therewith and extending inwardly of the base frame 101 and away from the outer wall 103 and generally perpendicular to the walls 103 and 105. Each of the walls 103, 104 and 105 and the support flange 106 extend the entire length of the associated side of the base frame 101 and are integrally joined as by welding to like members of the other channels 102 of the base frame 101. A cross bar 107 is welded to and interconnects two opposed sides 102 of the base frame 101, the cross bar 107 being channel shaped and including a web 108 welded to the flanges 106 and a pair of depending legs 109, see FIGS. 6 and 7. Interconnecting the other opposed sides 102 of the base frame 101 and the cross bar 107 are two U-shaped rigidifying members 110 having a channel cross section (see FIG. 2 also) and two rigidifying channels 111, whereby to form an integral, rigid and strong base frome 101.

Figures 6, 7, 8, 9, 9A, 10, 11, 12:
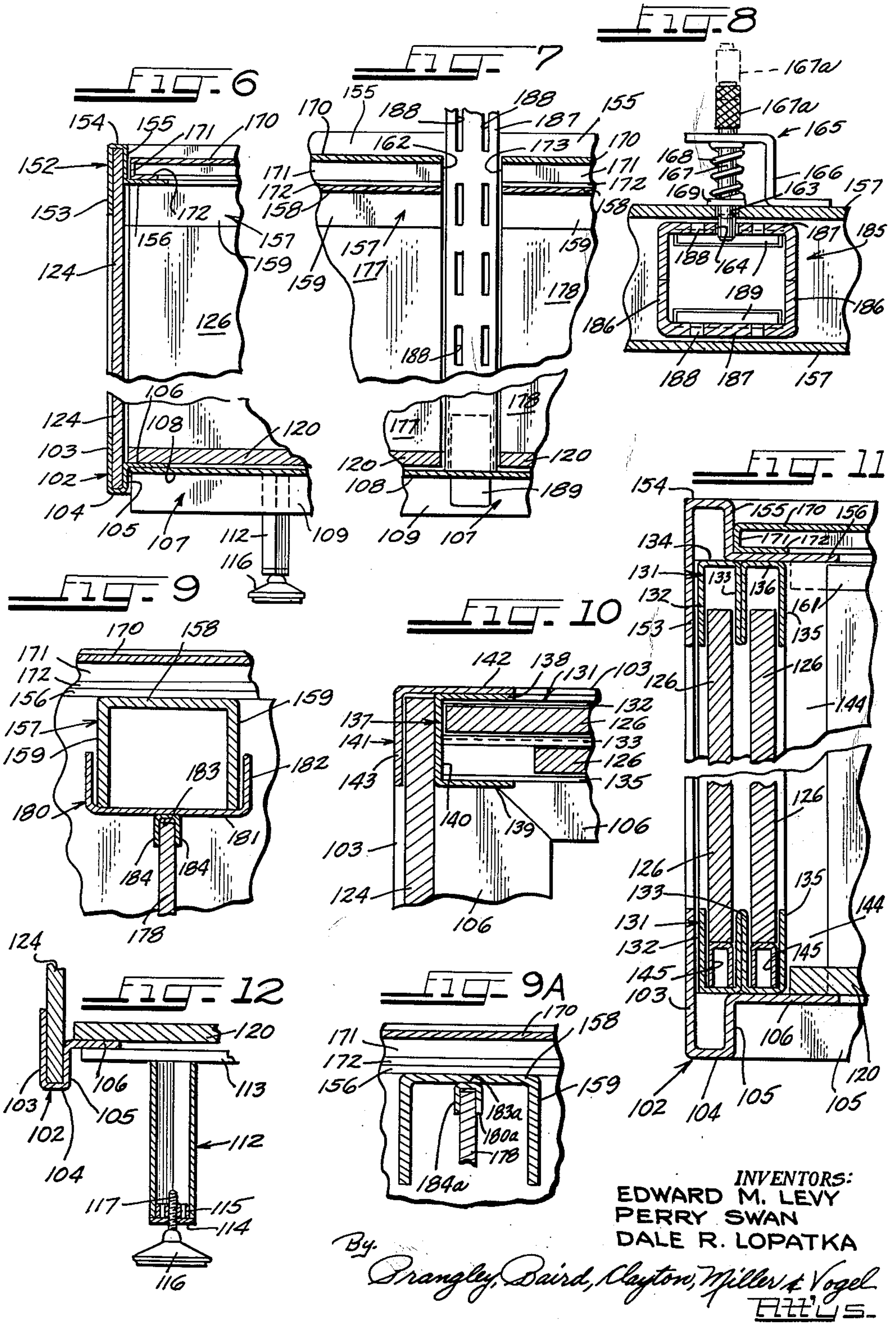
FIG. 6 is an enlarged fragmentary view in vertical section with certain parts broken away as seen along the line 6—6 of FIG. 3 illustrating the mounting of a side panel on the base and top frames.
FIG. 7 is an enlarged fragmentary view in vertical section with certain parts broken away as seen along the line 7—7 of FIG. 3 and illustrating the mounting of an upright.
FIG. 8 is an enlarged fragmentary view in vertical section as seen along the line 8—8 of FIG. 2 and illustrating the latch mechanism interconnecting an upright and the top frame.
FIG. 9 is an enlarged fragmentary view in vertical section as seen along the line 9—9 in FIG. 2 and illustrating the clip interconnecting the top frame and a divider panel.
FIG. 9A is a view similar to FIG. 9 and illustrating a modified structure interconnecting the top frame and a divider panel.
FIG. 10 is an enlarged view of the structure within the circle 10 of FIG. 3 and illustrating the connection between a side panel and a door frame.
FIG. 11 is an enlarged fragmentary view in vertical section with certain parts broken away as seen along the line 11—11 of FIG. 3 and illustrating the mounting of the sliding doors in a door frame.
FIG. 12 is an enlarged fragmentary view in vertical section as seen along the line 12—12 of FIG. 4 and illustrating a leg and its attachment to the base frame.

Five legs 112 are provided for the base frame 101, the upper ends of four of the legs 112 being secured as by welding to straps 113 that extend across the corners of the base frame 101 and have the ends thereof welded to adjacent support flanges 106 (see FIG. 12). The fifth leg 112 is secured to the center of the cross bar 107. The legs 112 are generally square in cross section and have a plate 114 on the lower end thereof carrying a nut 115 disposed within the leg 112. A glide 116 is provided for each of the legs 112, each glide 116 including a threaded shank 117 threadedly received by one of the nuts 115, whereby to provide adjustment between the glide 116 and the base frame 101 for leveling and the like.

A base deck is provided for the counter unit 100 by placing the bottom panels 120 in position upon the base frame 101. Each of the bottom panels 120 is generally rectangular in shape and has a first rectangular cutout or notch 121 therein at the center of one of the longer sides thereof to receive a reinforcing channel on the adjacent door frame 130 as will be explained more fully hereinafter. The other longer side of the bottom panel 120 has to spaced apart cutouts or notches 122 therein to receive the associated uprights 185 therethrough. The bottom panels 120 are disposed upon the support flanges 106 of the base frame 101 and serve substantially to fill the area bounded thereby to provide a base deck for the storage of merchandise.

Two of the side walls of the counter unit 100 are provided by the side panels 124 that are substantially rectangular in shape and have a length just slightly less than the length of the associated channel 102 on the base frame 101, the lower edges of each of the side panels 124 being received in one of the channels 102 and supported by the vertical walls 103 and 105 thereof as can best be seen in FIGS. 6 and 12 of the drawings. The other side walls of the counter unit 100 are provided by the sliding doors 126 in cooperation with the door frames 130. Each of the doors 126 is generally rectangular in shape and is provided with a pull or handle in the form of a finger receiving member 127, see particularly FIGS. 1 and 5 of the drawings.

Figure 5:
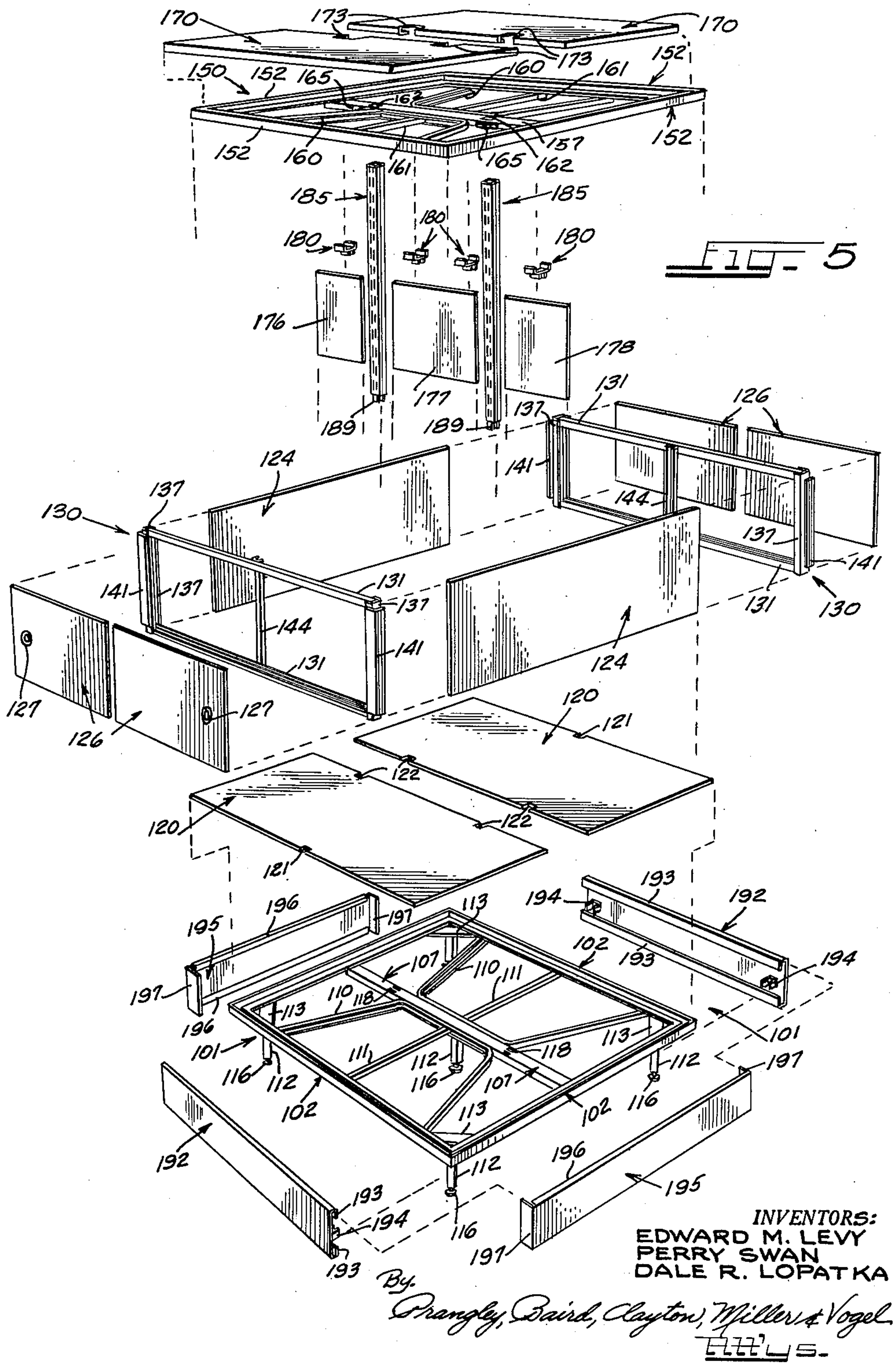
FIG. 5 is an exploded view in perspective of the parts of the display unit of FIG. 1.

The door frames 130 are identical in construction and, accordingly, only one will be described in detail, the same reference numerals being applied to like parts in the other. Referring to FIG. 5 of the drawings, it will be seen that the door frame 130 includes two horizontal frame members 131 that are identical in construction, the frame members 131 being formed of a single piece of metal shaped to provide two connected parallel channels including an outer wall 132, a double thickness intermediate wall 133 joined to the outer wall 132 by a web 134, and an inner wall 135 joined to the intermediate wall 133 by a web 136. The adjacent ends of the horizontal frame members 131 are connected by two vertical frame members 137 that are channel-shaped in cross section (see FIG. 10) and include outer and inner walls 138 and 139 joined by a web 140, the frame members 137 receiving the ends of the horizontal frame members 131 therein and being suitably secured thereto as by welding or the like. A connecting channel 141 is mounted on each of the frame members 131, the channel 141 including a first mounting flange 142 secured as by welding or the like to the outer wall 138 and a second retaining flange 143 disposed at right angles to the flange 142 and parallel to and spaced from the web 140 a distance slightly greater than the thickness of the associated side panel 124 to receive and to support it therebetween. As can be best seen in FIG. 5, the frame members 137 extend to the top and bottom of the door frame 130 whereas the connecting channels 141 terminate a short distance from both the top and bottom thereof. Interconnecting the frame members 131 at the center thereof is a reinforcing channel 144.

The sliding doors 126 fit within the parallel channels provided by the horizontal frame members 131 at the top and bottom of the door frame 130. In order to provide a smooth track for accommodating horizontal sliding movement of the doors 126, a channel 145 is disposed in each of the channels in the lower horizontal frame member 131, the doors 126 resting upon and sliding along the upwardly disposed web of the channel 145, see FIG. 11.

The upper edges of the side panels 124 and the door frames 130 are held in position and interconnected by the top frame 150 which is generally rectangular in shape (see FIG. 5) and includes four rigid metal channels 152 integrally joined at the corners as by welding. From FIG. 6 of the drawings it will be seen that each channel 152 is downwardly open and includes an outer vertical wall 153, a generally horizontal top wall 154 and an inner vertical wall 155 disposed generally parallel to the wall 153, but terminating above the lower edge thereof, and having a support flange 156 integral therewith and extending inwardly of the top frame 150 and away from the outer wall 153 and generally perpendicular to the walls 153 and 155. Each of the walls 153, 154 and 155 and the support flange 156 extend the entire length of the associated side of the top frame 150 and are integrally joined as by welding to like members of the other channels 152 of the top frame 150. A cross bar 157 is welded to and interconnects two opposed channels 152 of the top frame 150, the cross bar 157 being channel shaped and including a web 158 welded to the flanges 156 and a pair of depending legs 159. Interconnecting the other opposed channels 152 of the top frame 150 and the cross bar 157 are four U-shaped rigidifying members 160 having a channel cross section (see FIG. 2 also) and two rigidifying channels 161, whereby to form an integral, rigid and strong top frame 150.

A top deck is provided for the counter unit 100 by placing the top panels 170 in position upon the top frame 150. Each of the top panels 170 is generally rectangular in shape and has a depending flange 171 thereon (see FIG. 6 also) extending around the perimeter thereof, an inwardly extending reinforcing flange 172 being provided on the lower edge of the flange 171. One of the longer sides of the top panel 170 has two spaced apart cutouts or notches 173 therein to receive the associated uprights 185 therethrough. The top panels 170 are disposed upon the support flanges 156 of the top frame 150 and serve substantially to fill the area bounded thereby to provide a top deck or counter for the display of merchandise thereon.

It is often desirable to partition the space between the bottom panels 120 and the top panels 170 and to this end the three divider panels 176, 177 and 178 have been provided. The lower edges of the divider panels are received between the adjacent edges of the bottom panels 120 and rest upon the cross bar 107. The upper edges of the divider panels are anchored on the cross bar 157 and in one preferred embodiment of the invention are connected thereto by the clips 180, see FIG. 9 also. Each clip 180 includes a main wall 181 adapted to be disposed against the cross bar 157 and having a pair of retaining flanges 182 thereon extending perpendicular thereto and adapted to extend along the cross bar legs 159. Secured to the wall 181 as by welding or the like is a web 183 having a pair of flanges 184 disposed substantially perpendicular thereto and spaced apart a distance to receive the upper edge of a divider panel therebetween. There is shown in FIG. 9A a modification of the structure in which a channel 180*a* is provided having a web 183*a* welded to the underside of the cross bar web 158, the web 183*a* having a pair of flanges 184*a* disposed substantially perpendicular thereto and spaced apart a distance to receive the upper edge of a divider panel therebetween.

When it is desired to provide an above-the-counter shelf 190 in the counter unit 100, the two uprights 185 are installed. Each upright 185 is generally rectangular in cross section (see FIG. 8) and includes a first pair of imperforate side walls 186 and a second pair of walls 187 having parallel rows of horizontally aligned slots 188 therein. Two tongues 189 are welded to the inner surfaces of the walls 187 at the lower ends thereof, the tongues 189 fitting into slots 118 in the cross bar 107 to support the uprights 185 thereon. The upper ends of the uprights 185 extend through complementary shaped apertures 162 in the web 158 of the cross bar 157 on the top frame 150 and are secured thereto by a locking or latch mechanism 165, one of which is illustrated in FIG. 8. The mechanism 165 includes a Z-bar 166 secured at one end as by welding to the cross bar 157 of the top frame 150 and the other end is apertured slidingly to receive a locking pin 167 therethrough. The outer end of the pin 167 carries a knurled handle 167*a* and the inner end extends through an opening 163 in the cross bar 157 and into an aperture 164 in the upright 185 to make a locking engagement therewith. Means is provided to urge the pin 167 into the locking position in the form of a coil spring 168 under compression and disposed about the pin 167 and retained between the Z-bar 166 and a collar 169 fixedly attached to the pin 167. To remove or to insert the upright 185, the user grasps the handle 167*a* to retract the pin 167 against the action of the spring 168 to the position illustrated by dashed lines. The upright 185 can now be removed or inserted, the pin 167 moving automatically to the locking position upon release thereof when the aperture 164 is in alignment therewith.

The shelves 190 are supported on the uprights 185 by means of brackets 191 that engage in the slots 188 of the uprights 185. In certain instances it is desirable to provide kick plates to cover the area defined by the legs 112 and there is shown in FIG. 5 of the drawings a suitable structure including two identical supporting kick plates 192 and two identical supported kick plates 195. The kick plates 192 each includes a reinforcing flange 193 along the upper and lower edges thereof and a mounting clip 194 at each end thereof adapted to engage the legs 112 to mount the kick plate 192 thereon. The kick plates 195 have upper and lower flanges 196 adapted to receive the ends of the kick plates 192 therebetween and end flanges 197 adapted to overlie the ends of the kick plates 192, the kick plates 195 being supported by the kick plates 192.

In assembling the counter unit 100, the base 101 has the glides 116 mounted thereon by threading the shafts 117 into the nuts 115, after which the base frame 101 is positioned on the floor or any other underlying support surface as is diagrammatically illustrated in FIG. 5. The bottom panels 120 are then placed in position on the support flanges 106 after which the slide panels 124 are positioned in the associated channels 102 with the lower edges of the side panels 124 supported in a generally vertical position by means of the side walls 103 and 105. The two door frames 130 are then placed in operative position upon the associated support flanges 106 with the outer faces of the door frames 130 disposed against the associated channel wall 103, the adjacent vertical edges of the side panels 124 being disposed between the flange 143 and the web 140 as is illustrated in FIG. 10. The parts at this stage of assembly are self-supporting without the use of any additional fasteners or fixtures.

As the next step in assembly, the bottom panels 120 are spaced from each other and the divider panels 176, 177 and 178 are inserted through the opening between the adjacent edges of the bottom panels 120 and downwardly onto the cross bar 107. The bottom panels 120 can be then pushed against the adjacent edges of the divider panels whereby temporarily to hold the divider panels in a vertical position; the clips 180 are now disposed upon the upper edges of the various divider panels. The top frame is then lowered onto the assembly, the outer walls 153 thereof being disposed outwardly with respect to the side panels 124 and the door frames 130 so that the upper edges of the side panels 124 move into the position illustrated in FIG. 6 of the drawings, wherein the upper edges of the side panels 124 are retained between the channel walls 153 and 155. The upper ends of the door frames 130 are disposed between the outer walls 153 and the adjacent ends of the channels 160 and 161, whereby to retain the door frames 130 in the proper operative position. The downward movement of the top frame 150 also causes engagement of the cross bar 157 with the clips 180 (FIG. 9), the side flanges 182 of the clips passing across the outer surfaces of the cross bar 157. In the modification illustrated in FIG. 9A, the channel 180*a* is moved onto and into engagement with the upper edge of the divider panels.

The sliding doors 126 are next installed, the channels 145 first being placed in operative position with the door frames 130 as is illustrated in FIG. 11 of the drawings, the webs of the channels 145 being disposed upwardly to provide a track along which a sliding door 126 may move. The innermost sliding door 126 has the upper end thereof placed into the upper channel defined by the flanges 133 and 135 and is then lifted upwardly until the lower edge of the door 126 clears the lower flanges 132 and 133, thus permitting the lower edge of the door 126 to be swung inwardly until the door is in a vertical position. The door 126 is then dropped until the lower edge thereof rests on the channel 145. This operation is repeated with each of the other three sliding doors 126.

In those cases in which the above-the-counter shelf 190 is to be installed, the uprights 185 are next placed in operative position by inserting the lower ends thereof through the opening 162 in the cross bar 157 and thereafter placing the tongues 189 in the slots 118 of the cross bar 107, this being accomplished by first retracting the pin 167; after the upright 185 is in position, the pin 167 is released and the outer end of the pin 167 enters the aperture 164 to lock the upright 185 in operative position. It will be noted that the locking mechanism 165 is readily available through the open top frame 150 prior to placement of the top panels 170 thereon.

Assembly of the counter unit 100 is completed by placing the top panels 170 in operative position upon the support flanges 156, mounting the brackets 191 and the associated shelf 190 on the uprights 185 and in those cases, where desired, by assembling the kick plates 192 and 195 upon the base frame legs 112.

It will be seen that the assembly of the complete counter unit 100 can be accomplished without the use of any tool whatsoever, without the use of any removable fasteners such as screws, bolts, nuts or the like and without the use of any jigs or fixtures at any intermediate stage of assembly. When the parts are assembled as described above, the resultant counter unit 100 is rigid and self-supporting, the door frames 130 and the side panels 124 providing the necessary strength for supporting the load upon the top panels 170 which can take full or even extreme loads of merchandise. The load upon the shelf 190 is transmitted directly through the uprights 185 to the base frame 101. Both the shelves 190 and the counter formed by the top panels 170 are desirable for the display of merchandise and the area enclosed between the bottom panels 120 and the top panels 170 is useful for storage of merchandise to provide back-up stock storage, thus saving trips to the stock room, the merchandise being readily accessible through the sliding doors 126. Each of the glides 116 can be adjusted with respect to the associated leg 112 so that the height of the counter unit 100 can be adjusted within limits and leveling thereof can be obtained. The shelves 190 are easily adjustable along the uprights 185 to accommodate a variety of display programs.

The counter unit 100 can be quickly disassembled by reversing the procedure outlined above. More specifically, the shelves 190 and the supporting brackets 191 therefor are removed after which the top panels 170 are removed. The locking mechanisms 165 are then operated to release the uprights 185 which are then withdrawn and after this the top frame 150 can be easily lifted from the lower parts. The door frames 130 and the side panels 124 are then removed after which the bottom panels 120, the kick plates (if any) and the glides 116 can be removed, if desired. The complete assembly or disassembly of the counter unit 100 is accomplished quickly and easily without the use of any tools whatsoever. The various parts when disasssembled can be packed into a relatively small volume to facilitate shipping and storing thereof. More specifically, three, four or even five times as many disassembled counter units 100 can be packed in the same space needed to receive a rigid unit of the same size used heretofore, thus significantly reducing the cost of transportation, shipping and storage. Also a damaged part of the counter unit 100 can be easily replaced at a fraction of the cost of returning an integral rigid unit to its factory of origin for repair and rebuilding.

The base frame 101, the door frames 130, the top frame 150, and the uprights 185 are preferably formed of metal or some other strong material of construction, a preferred material being stainless steel. The bottom panels 120, the side panels 124, the doors 126 and the divider panels 176, 177 and 178 may also be formed of metal but it is preferred that these members be formed of other materials such as synthetic organic plastics and particularly filled plastic compositions, a preferred material being that sold under the trademark "Masonite." The top panels 170 may be formed of the same material as the bottom panels 120 but in the form of the invention illustrated in the drawings, the top panels 170 have been illustrated as being formed of metal. The kick plates 192 and 195 may likewise either be formed of plastic compositions or of metal.

There is shown in FIGS. 13 to 17 of the drawings a second counter unit 200 made in accordance with and embodying the principles of the present invention, the counter unit 200 being similar to the counter unit 100 illustrated in FIG. 1 and having substantially only half the volume and counter area thereof and having doors only on one side thereof. The counter unit 200 includes a base frame 201, a single bottom panel 220, a pair of side panels 224, two sliding doors 226 received in a door frame 230, a pair of corner members 292, a top frame 250, a single top panel 270, three back panels 276, 277 and 278, and two uprights 285 carrying thereon an above-the-counter shelf 290.

The base frame 201 is generally similar to the base frame 101 described above and, accordingly, like reference numerals in the "200" series have been utilized to designate like parts thereof. More specifically, the base frame 201 includes four rigid metal channels 202 integrally joined at the corners as by welding, the channels 202 being upwardly opening and having an inwardly directed support flange 206 integral therewith and extending inwardly with respect to the base frame 201. A U-shaped rigidifying member 210 having a channel cross section is provided between the two longer sides of the base frame 201 and a rigidifying channel 211 is also provided, whereby to form an integral rigid and strong base frame 201.

Four legs 212 are provided near the corners of the base frame 201, the legs 212 being secured to straps 213 that are in turn secured to the support flanges 206. The lower ends of the legs 212 are identical in construction to the legs 112 described above and are provided with glides 216 which are also identical in construction to the glides 116 described above.

A base deck for the counter unit 200 is provided by the bottom panel 220 which is generally rectangular in shape and has a first rectangular notch 221 thereon at the center of the one of the longer sides thereof to receive a reinforcing channel on the door frame 230 and having two spaced apart notches 222 on the other longer side thereof to receive the uprights 285 therethrough. The bottom panel 220 is disposed upon the support flanges 206 and serves substantially to fill the area bounded thereby to provide a base deck for the storage of merchandise.

Two of the side walls of the counter unit 200 are provided by the side panels 224 that are substantially rectangular in shape and have a length slightly less than the length of the associated channels 202, the lower edges of each of the side panels 224 being received in one of the channels 202. The front wall of the display unit 200 is provided by the sliding doors 226 in cooperation with the door frame 230, each of the doors 226 being generally rectangular in shape and provided with a pull or handle 227.

The door frame 230 is constructed generally like the door frames 130 described above and, accordingly, like reference numerals have been applied to like parts thereof, the numerals for the door frame 230 being of the "200" series. Accordingly, no further details of description of the door frame 230 will be given in the interest of brevity.

Figures 16, 17, 21, 22, 23, 24:
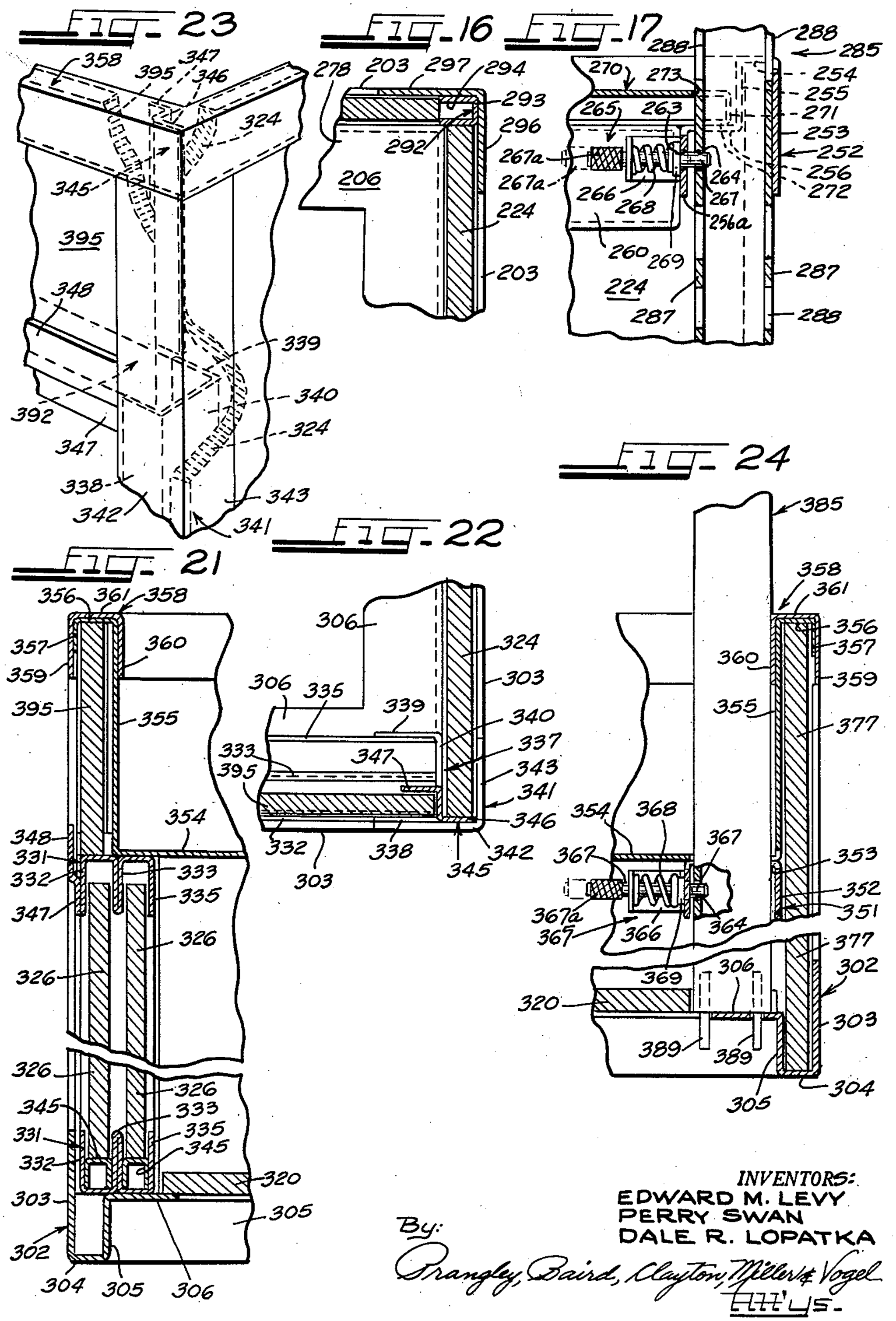
FIG. 16 is an enlarged fragmentary view as seen along the line 16—16 of FIG. 14 and illustrating the connection between a corner frame member and a back panel and a side panel.
FIG. 17 is an enlarged fragmentary view in vertical section as seen along the line 17—17 of FIG. 13 and illustrating the latch mechanism interconnecting an upright and the top frame.
FIG. 21 is an enlarged fragmentary view in vertical section with certain parts broken away as seen along the line 21—21 of FIG. 18.
FIG. 22 is an enlarged fragmentary view in horizontal section as seen along the line 22—22 of FIG. 18.
FIG. 23 is an enlarged fragmentary view in perspective of the parts within the circle 23 of FIG. 18.
FIG. 24 is an enlarged fragmentary view in vertical section with certain parts broken away as seen along the line 24—24 of FIG. 18 and illustrating the mounting of an upright.

The rear of the counter unit 200 is closed by the panels 276, 277 and 278, each of which is rectangular in shape and has a height equal to that of the side panels 224, the corner members 292 serving to interconnect the adjacent edges of the panels 224 with the panels 276 and 278. Referring particularly to FIG. 16 of the drawings, it will be seen that the corner member 292 includes an inner channel including a web 293 having two panel legs 294 thereon. Attached to the channel is a piece including two flanges 296 and 297 disposed at right angles to each other and having a length slightly less than the length of the channel, the flange 296 lying along the web 293 and the flange 297 lying along the outer surface of the channel leg 294, the members being integrally secured as by welding or the like. The lower end of each corner member 292 is received in a corner of the base frame 201 and particularly in a channel 202 thereof. The flanges 296 and 297 lie in substantially the same planes as the outer walls of the associated channels 202 and overlap the adjacent vertical edges of the panels 276 and 278.

The upper edges of the side panels 224 of the rear panels 276, 277 and 278 of the door frame 230 and of the corner members 292 are held in position by and are interconnected by the top frame 250. The top frame 250 is generally rectangular in shape (see FIG. 15) and includes four rigid channels 252 integrally joined at the corners as by welding, each channel 252 being downwardly opening and including an outer vertical wall 253, a generally horizontal top wall 254 and an inner vertical wall 255 disposed generally parallel to the wall 253 but terminating above the lower edge thereof (see FIG. 17). A support flange 256 is formed integral with the lower edge of the inner wall 255 and extends inwardly with respect to the top frame 250 and away from the outer wall 253 and generally perpendicular to the walls 253 and 255. Interconnecting the longer sides of the top frame 250 is a U-shaped rigidifying member 260 having a channel cross section and a rigidifying channel 261, whereby to form an integral, rigid and strong top frame 250.

A top deck is provided for the counter unit 200 by placing the top panel 270 in position upon the top frame 250, the top panel 270 being generally rectangular in shape and having a dependent flange 271 thereon (see FIG. 17) extending around the perimeter thereof, and inwardly extending reinforcing flange 272 being provided on the lower edge of the flange 271. One of the longer sides of the top panel 270 has two spaced apart cutouts or notches 273 therein to receive the associated uprights 285 therethrough. The top panel 270 is disposed upon the support flanges 256 of the top frame 250 and serves substantially to fill the area bounded thereby to provide a top deck or counter for the display of merchandise thereon.

The uprights 285 are identical in construction to the uprights 185 and described above and, accordingly, the description thereof will not be repeated, like numerals in the "200" series being applied to the uprights 285. Each of the uprights 285 extends through a complementarily shaped opening provided by a cutout 273 in the top panel 270 and a cutout in the rear channel 252 (see FIG. 17) that cooperate to provide the opening to receive the associated upright 285. The tongues 289 on the lower ends of the uprights 285 are received within slots 218 in the support flange 206 on the base frame 201.

As may be best seen in FIG. 17 of the drawings, a locking mechanism 265 is provided to hold an upright 285 in operative relationship to the top frame 250, the support flange 256 having a downturned flange **256*a* formed thereon for this purpose, the flange 256*a* being disposed inwardly with respect to the upright 285. Mounted on the flange 256*a* is a Z-bar 266 having an opening 263 thereon to receive a locking pin 267 therethrough. The outer end of the pin 267 carries a knurled handle 267*a* and the inner end extends through an opening 264 in the upright 285 to make a locking engagement therewith. Means is provided to urge the pin 267 into the locking position in the form of coil spring 268 under compression and disposed about the pin 267 and retained between the Z-bar 266 and a collar 269 fixedly attached to the pin 267**.

Figures 13, 14:
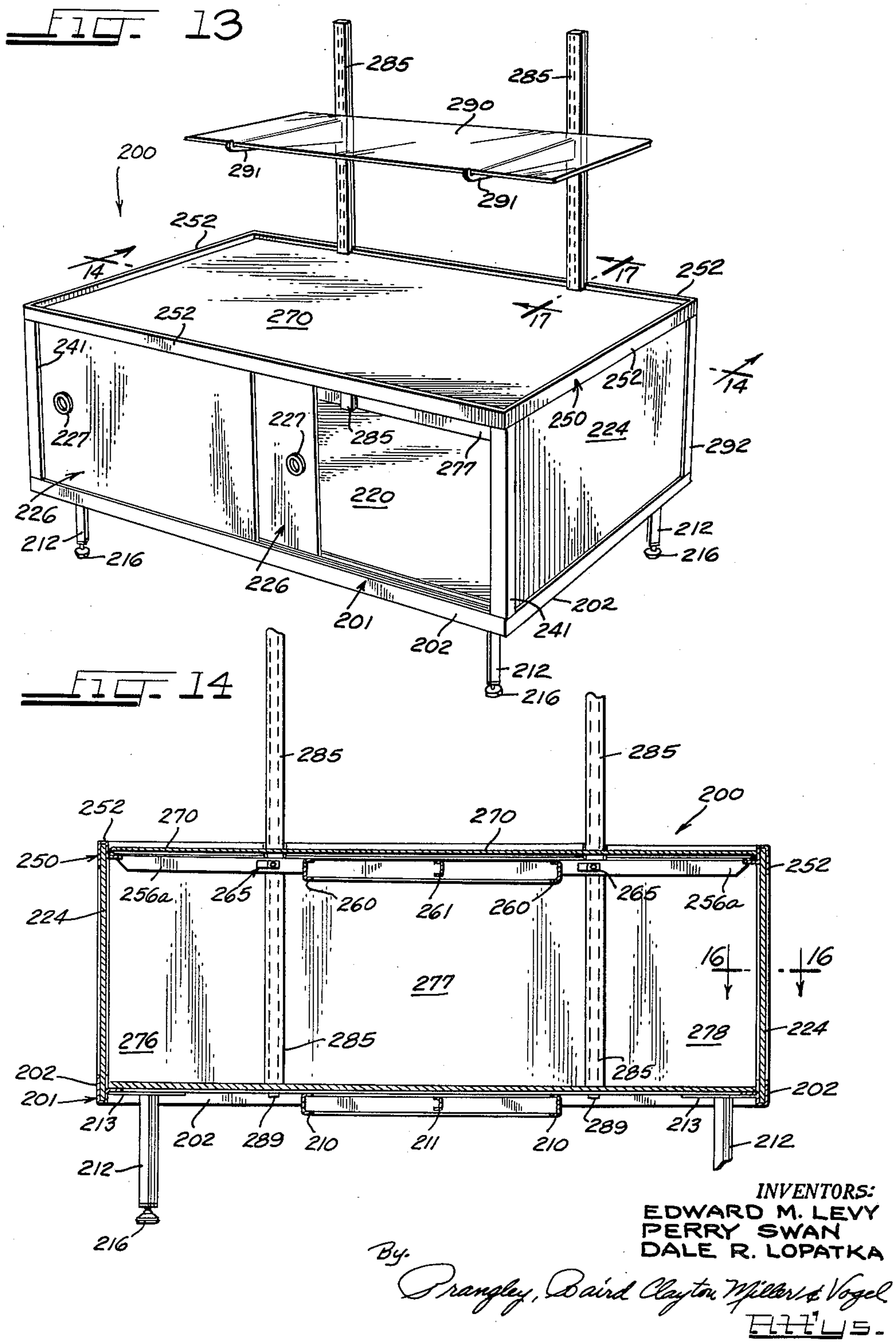
FIG. 13 is a perspective view of a second preferred embodiment of the invention similar to the counter unit illustrated in FIG. 1 but having doors only on one side thereof.
FIG. 14 is a fragmentary view in vertical section through the display unit of FIG. 13 as seen along the line 14—14 thereof.
Figure 15:
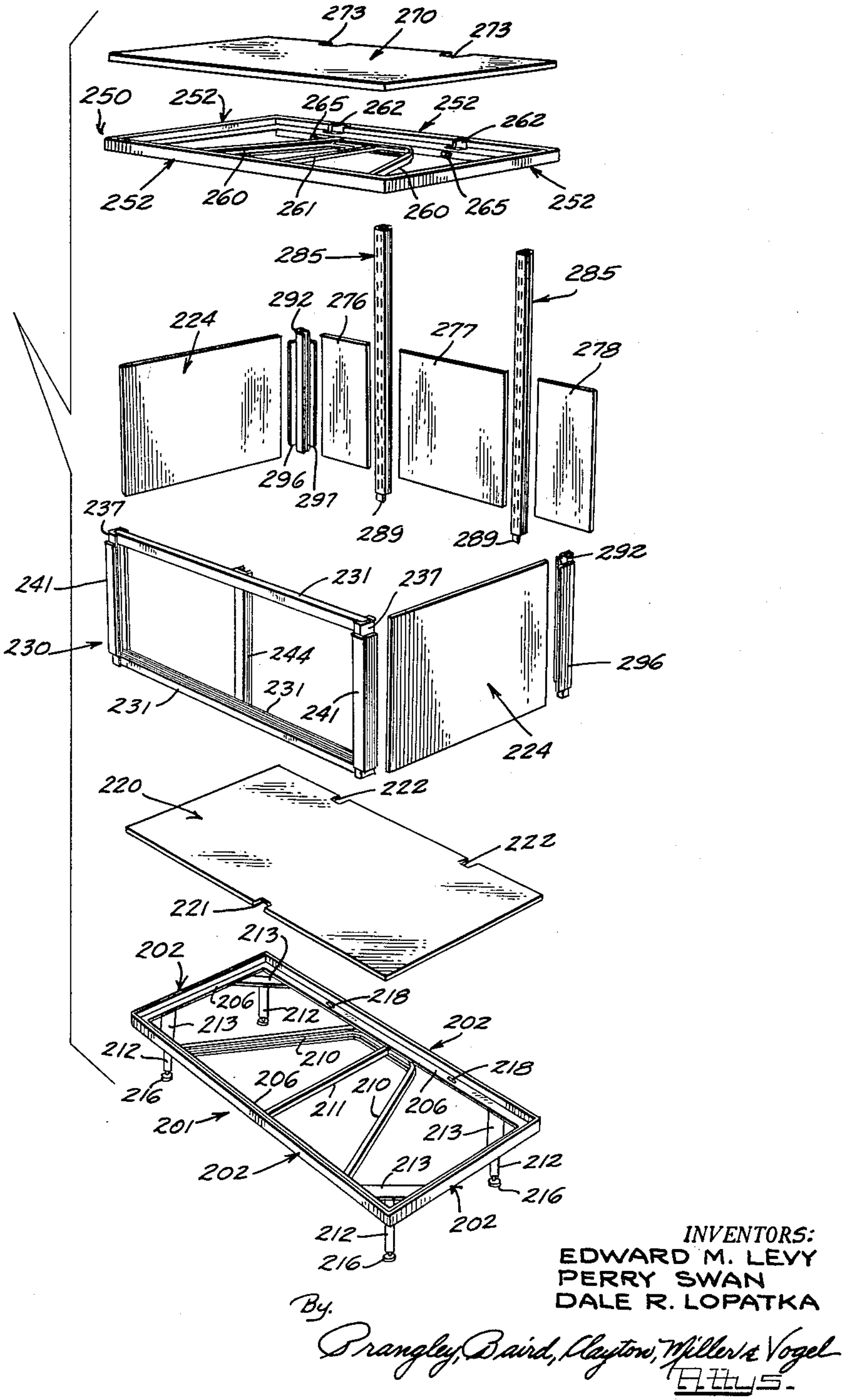
FIG. 15 is an exploded view in perspective of the parts of the display unit of FIG. 13.

The counter unit 200 is assembled by placing the glides 216 on the legs 212 and then placing the base frame 201 on a suitable support surface as is illustrated in FIG. 15 of the drawings. The bottom panel 220 is then arranged upon the support flanges 206 with the notches 222 in general alignment with the slots 218. Next the side panels 224, the door frame 230, the rear panels 276, 277 and 278 and the corner members 292 are inserted in their proper positions around the base frame 201 and particularly the channels 202 thereof. The channels 202 can serve temporarily to support all of these pieces and it also is pointed out that the door frame 230 and the corner members 292 interlock with the adjacent panels to give added support one to the other. The top frame 250 is then placed in operative position, the upper edges of the panels 224, 276, 277 and 278 and the upper ends of the corner members 292 being received within the downwardly opening channels 252 thereof. All of the parts are now interlocked in place. If shelves 290 are to be mounted as illustrated in FIG. 13, the uprights 295 are then placed into position, the locking mechanisms 265 being operated as described above. The top panel 270 can now be placed in operative position after which the brackets 291 and shelves 290 can be mounted on the uprights 295 thus to complete the assembly of the counter unit 200. It will be seen that the assembly has been accomplished without the use of any tools, fixtures, jigs or the like or the use of any kind of fastener whatsoever. The parts can be readily disassembled by reversing the described procedure and after disassembly the parts can be stored in a compact form or packed for ready shipment. The materials of construction of the counter unit 200 are the same as those of the counter unit 100 for like parts.

Figure 20:
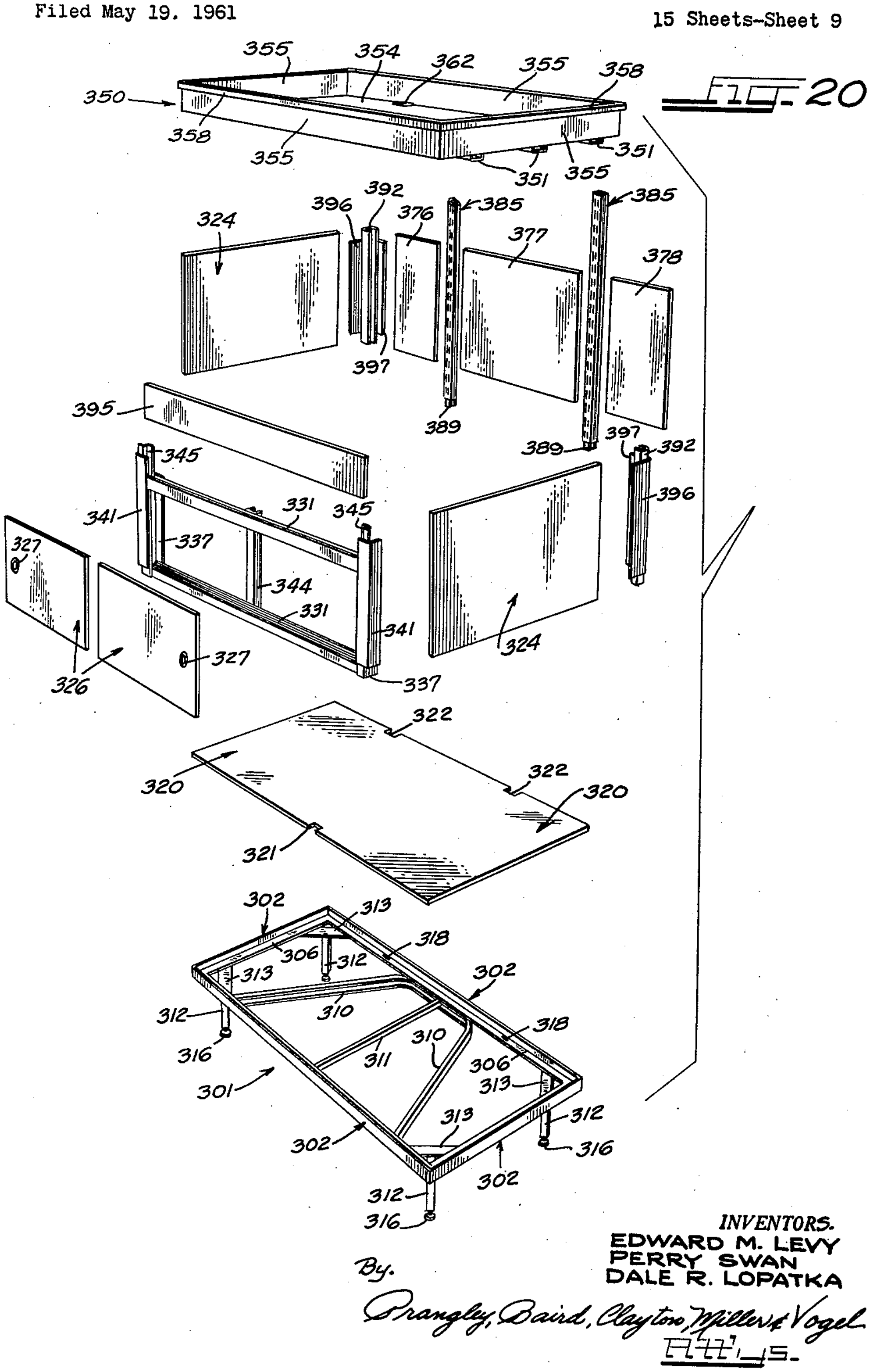
FIG. 20 is an exploded view in perspective of the parts of the counter unit of FIG. 18.

There is shown in FIGS. 18 to 24 of the drawings a third counter unit generally designated by the numeral 300 and made in accordance with and embodying the principles of the present invention. The counter unit 300 is generally like the counter unit 200 described above but differs therefrom in that it is provided with a well top. Referring to FIG. 20 of the drawings, it will be seen that the display unit 300 comprises generally a base frame 301, a single bottom panel 320, a pair of side panels 324, two sliding doors 326 received in a door frame 330, a top frame 350, three rear panels 376, 377 and 378, two uprights 385 carrying thereon an above-the-counter shelf 390, two corner members 392 and a front panel 395.

The base frame 301 is substantially identical in construction to the base frame 201 described above and, accordingly, like reference numerals in the "300" series have been utilized to designate like parts thereof. The bottom panel 320, the side panels 324 and the sliding doors 326 are identical in construction to the corresponding parts described above including the bottom panel 220, the side panels 224 and the sliding doors 226, respectively, and accordingly, like reference numerals in the "300" series have been utilized to designate like parts in FIGS. 18 to 24.

The door frame 330 includes two horizontal frame members 331 that are identical in construction, the frame members 331 being formed of a single piece of metal shaped to provide two connected parallel channels including an outer wall 332, a double thickness intermediate wall 333 joined to the outer wall 332 by a web 334, and an inner wall 335 joined to the intermediate wall 333 by a web 336. The adjacent ends of the horizontal frame members 331 are connected by two vertical frame members 337 that are channel shaped in cross section (see FIG. 22) and include outer and inner walls 338 and 339 joined by a web 340, the frame members 337 receiving the ends of the horizontal frame members 331 therein and being suitably secured thereto as by welding or the like. A connecting channel 341 is mounted on each of the frame members 337, the channel 341 including a first mounting flange 342 secured as by welding or the like to the outer wall 338 and a second retaining flange 343 disposed at right angles to the flange 342 and parallel to and spaced from the web 340 a distance slightly greater than the thickness of the associated side panel 324 to receive and to support it therebetween. As can be best seen in FIGS. 20 and 23, the frame members 337 extend to the bottom of the door frame 330 and slightly above the upper frame member 331, the connecting channel 341 also extending substantially above the upper horizontal frame member 331 to aid in supporting the front panel 395. More specifically, the front panel 395 rests upon the upper surface of the top frame member 331 (see FIG. 21) and is at least partially retained in place by a Z-bar 345 having a connecting flange 346 secured as by welding to the inner surface of the flange 342 and having a retaining flange 347 disposed parallel to the flange 346 and extending away therefrom and parallel to the flange 342 to receive one end of the front panel 395 therebetween (see FIG. 22), the Z-bar 345 extending substantially above the top frame member 331 (see FIG. 20) to accommodate the front panel 395 which closes the space in the front formed by the well counter as will be explained more fully hereinafter.

The lower edge of the front panel 395 is held in place partially by a retaining member including an attachment flange 347 suitably secured as by welding to the outer wall 332 and having an offset retaining flange 348 extending outwardly therefrom and upwardly above the upper surface of the top frame member 331 (see FIG. 21).

Reinforcement for the door frame 330 is provided by a vertically extending channel 344 connected to the frame members 331 intermediate the ends thereof.

The sliding doors 326 fit within the parallel channels provided by the horizontal frame members 331 on the top and bottom of the door frame 330 in the same manner that the sliding doors 126 are mounted in the door frame 130 described above, the door panels 326 together with the front panel 395 serving to close the front wall of the counter unit 300. The side walls of the counter unit 300 are provided by the side panels 324 that are substantially rectangular in shape and have a length slightly less than the length of the associated channels 302, the lower edges of each of the side panels 324 being received in one of the channels 302. The rear of the counter unit 300 is closed by the panels 376, 377 and 378, each of which is rectangular in shape and has a height equal to that of the side panels 324, the corner members 392 serving to interconnect the adjacent edges of the panels 324 with the panels 376 and 378. The corner members 392 are identical in construction to the corner members 292 described above and, accordingly, like reference numerals in the "300" series have been applied to like parts thereof.

The upper edges of the side panels 324, of the rear panels 376, 377 and 378, of the door frame 330, of the corner members 392 and of the front panel 395 are held in position by and are interconnected by the top frame 350, the top frame 350 also serving as a well counter top. The top frame 350 is generally rectangular in shape (see FIGS. 18 and 20). In general the top frame 350 includes three parallel channels 351 arranged with the legs 352 thereof disposed downwardly and the webs 353 thereof disposed upwardly (see FIG. 24) and suitably secured as by welding to a rectangular bottom or counter member 354 which is generally imperforate and has dimensions to fit within the area bounded by the side panels 324, the rear panels 376, 377 and 378 and the front panel 395. Extending around the counter member 354 and upwardly therefrom is a wall 355, the wall 355 extending completely therearound and being disposed substantially perpendicular thereto and having a substantial height to provide a well top, the upper edge of the wall 355 having an outturned flange 356 thereon and extending completely therearound and provided with a downwardly extending reinforcing flange 357, the flange 356 resting upon the upper edges of the side panels 324, of the rear panels 376, 377 and 378 and of the top panel 395 when the parts are assembled (see FIGS. 21, 23 and 24). Reinforcement is provided for the counter top 350 in the form of a U-shaped channel 358 extending clear around the periphery thereof, the channel 358 including an outer flange 359, and an inner flange 360 connected by a web 361.

In order to accommodate the uprights 385, the counter top 350 is provided with two apertures 362 therethrough, the apertures 362 extending through the counter member 354 and the adjacent channel 351 (see FIG. 24). The uprights 385 are substantially identical in construction to the uprights 185 described above and, accordingly, the description thereof will not be repeated, like reference numerals of the "300" series being applied to the like parts thereof. In order to hold the uprights 385 in proper operative relationship with the other parts of the display unit 300, each of the uprights 385 has been provided with an associated locking mechanism 365 (see FIG. 24). More specifically, there is mounted on the innermost vertical flange 352 of the rear channel 351 a Z-bar 366 having an opening therethrough to receive a locking pin 367, the outer end of the pin 367 carrying a knurled handle 367*a* and the inner end extending through an opening 364 in the associated upright 385 to make a locking engagement therewith. Means is provided to urge the pin 367 into a locking position in the form of a coil spring 368 under compression and disposed about the pin 367 and retained between the Z-bar 366 and a collar 369 fixedly attached to the pin 367.

Figure 18:
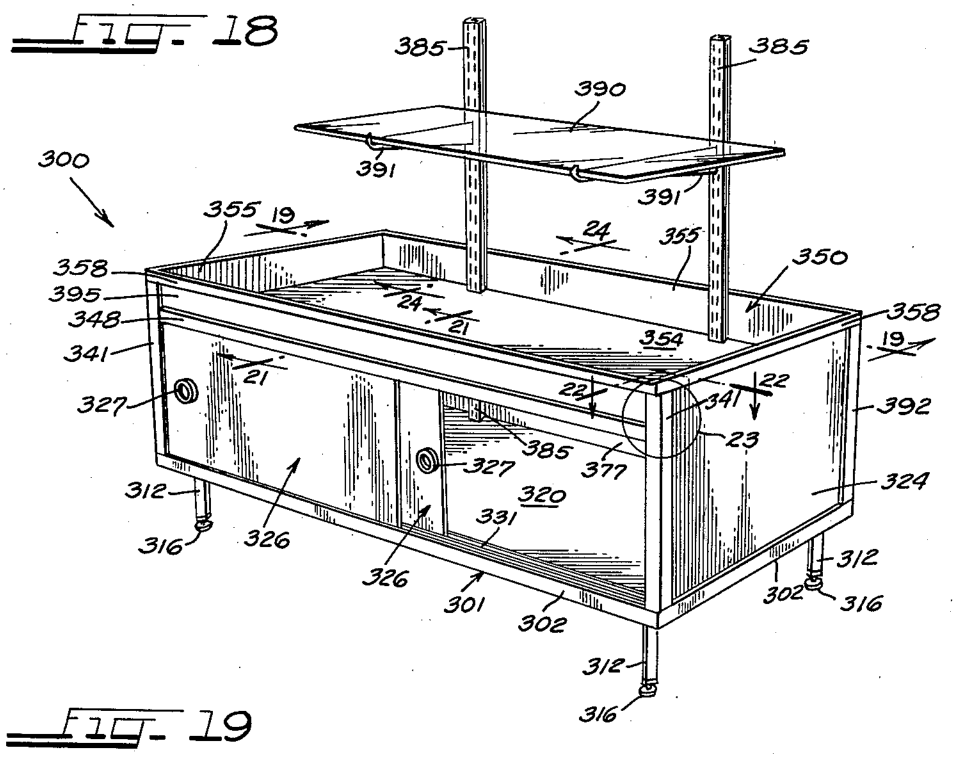
FIG. 18 is a perspective view of a third preferred embodiment of the invention similar to the counter unit of FIG. 13 but having a well top thereon.
Figure 19:
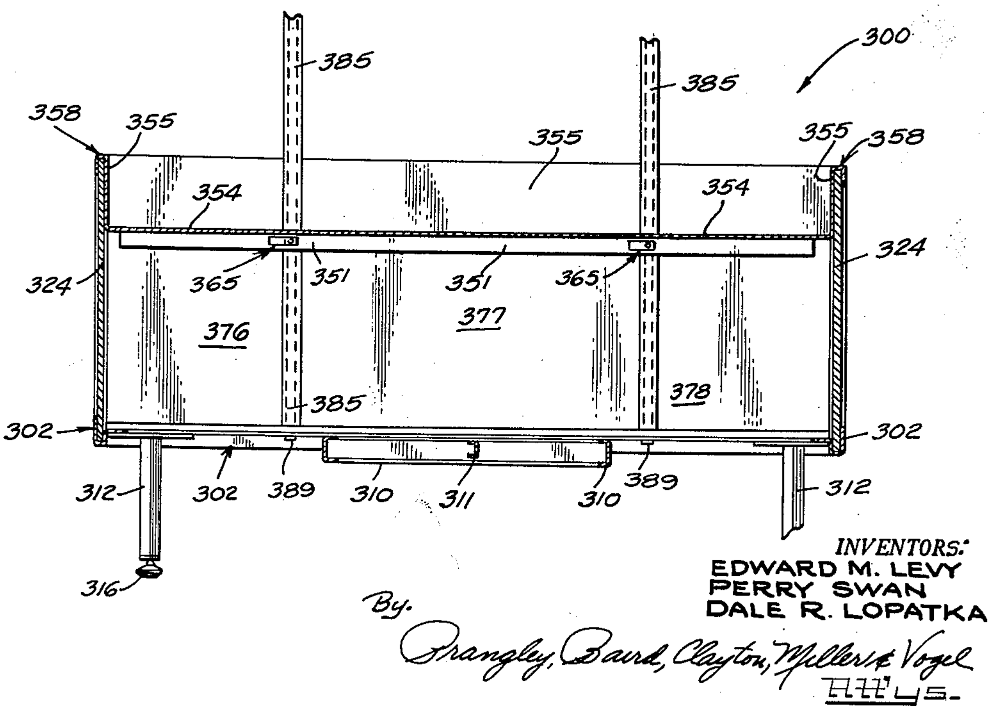
FIG. 19 is a fragmentary view in vertical section through the counter unit of FIG. 18 as seen along the line 19—19 thereof.

The counter unit 300 is assembled by placing the glides 316 on the legs 312 and then placing the base frame 301 on a suitable support surface as is illustrated in FIG. 20 of the drawings. The bottom panel 320 is then arranged upon the support flanges 306 with the notches 322 in general alignment with the slots 318. Next the side panels 324, the door frame 330, the rear panels 376, 377 and 378, the corner members 392 and the front panel 395 are inserted in their proper positions around the base frame 301 and particularly the channels 302 thereof. The channels 302 serve temporarily to support all of the associated pieces and it is also pointed out that the door frame 330 supports the front panel 395 in operative position and further cooperates with the corner members 392 to interlock with the adjacent panels to give added support one to the other. The top frame or counter top 350 is then placed in operative position, the upper edges of the side panels 324, of the rear panels 376, 377 and 378, and of the front panel 395 and the upper ends of the corner members 392 being received within a downwardly opening channel formed by the wall 355 and the flanges 356 and 357 thereby to interlock all of the parts in place. If the shelves 390 are to be mounted as illustrated in FIG. 18, the uprights 395 are then placed in position, the locking mechanism 365 being operated as described above. The brackets 391 and the shelves 390 can now be mounted on the uprights 395 thus to complete the assembly of the counter unit 300. It will be seen that the assembly has been accomplished without the use of any tools, fixtures, jigs or the like or the use of any kind of fastener whatsoever. The parts can be readily disassembled by reversing the described procedure for assembly and after disassembly the parts can be stored in a compact form or packed for ready shipment. The material of construction of the counter unit 300 are the same as those of the counter unit 100 for like parts.

Figure 25:
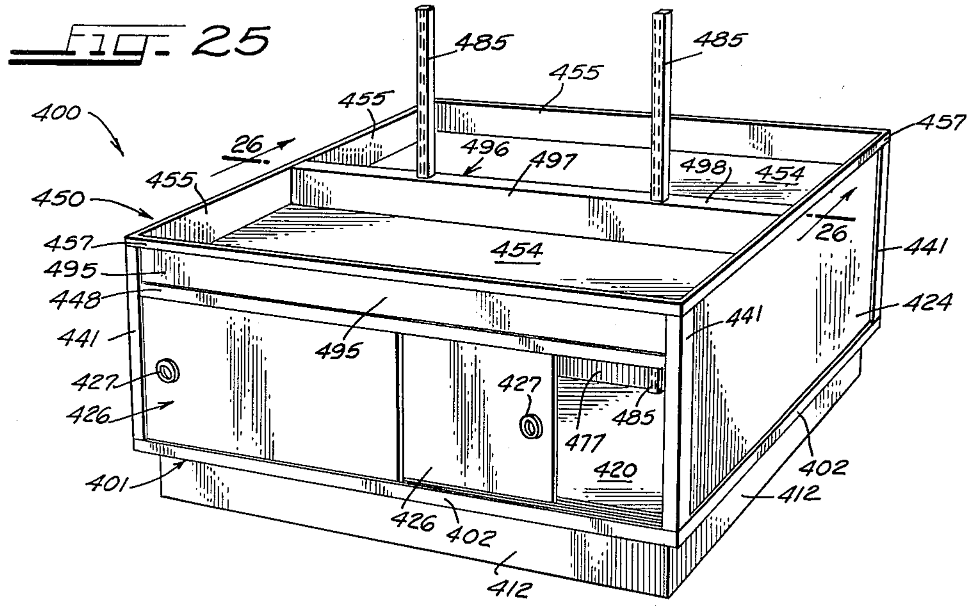
FIG. 25 is a perspective view of a fourth preferred embodiment of the invention similar to the counter unit of FIG. 1 but having a well top thereon.
Figure 26:
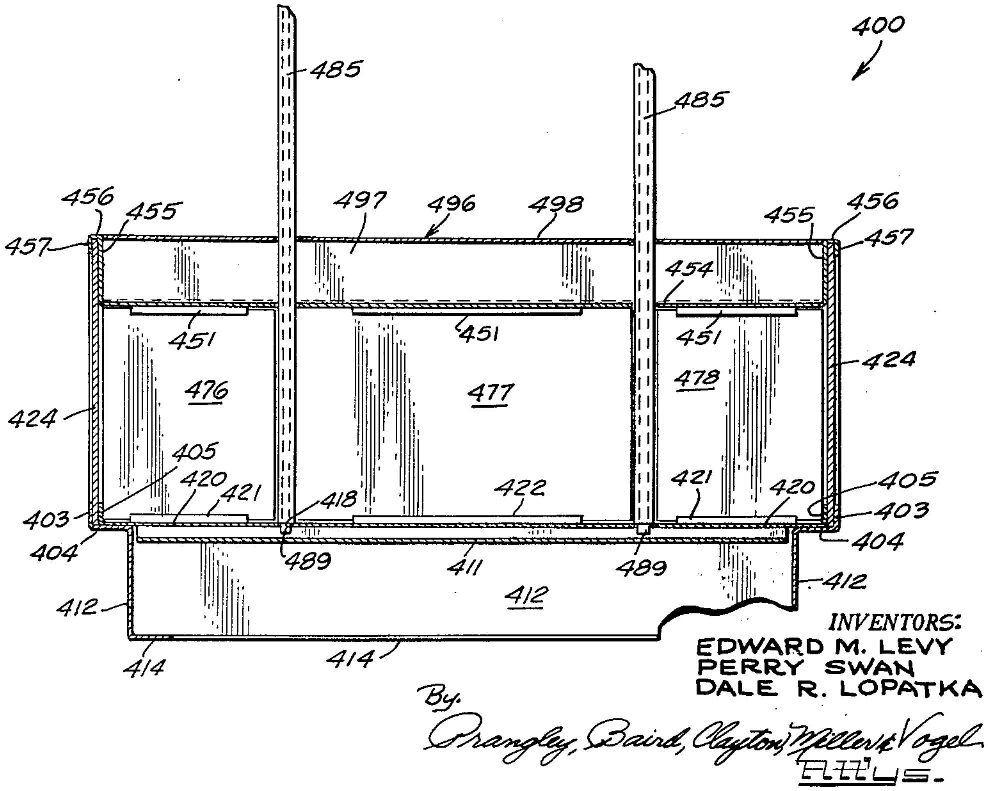
FIG. 26 is a fragmentary view in vertical section through the counter unit of FIG. 25 as seen along the line 26—26 thereof.
Figure 27:
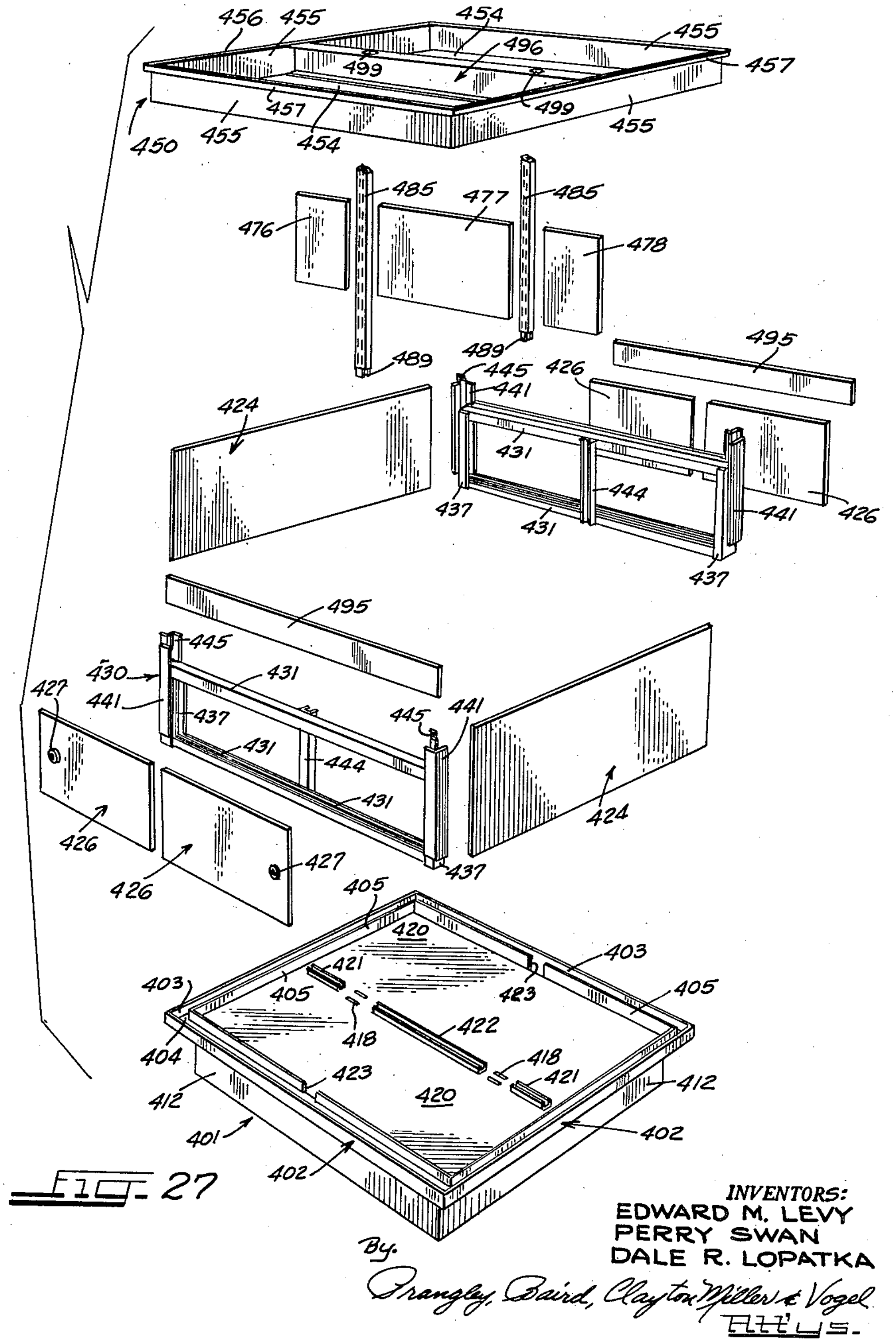
FIG. 27 is an exploded view in perspective of the parts of the display unit of FIG. 25.

There is shown in FIGS. 25, 26 and 27 of the drawings a fourth counter unit generally designated by the numeral 400 and made in accordance with and embodying the principles of the present invention. The counter unit 400 is similar to the counter unit 300 described above but differs therefrom in that a modified form of a base frame is provided and a well top having two well sections has been incorporated in a display unit more like the counter unit 100. Referring to FIG. 27 of the drawings, it will be seen that the counter unit 400 comprises generally a base frame 401, a pair of side panels 424, two pairs of sliding doors 426 received in cooperating door frames 430, a top frame or counter top 450, three divider panels 476, 477 and 478, two uprights 485 adapted to carry thereon above the counter shelves, and two front panels 495. The base frame 401 includes four upwardly opening channels 402 extending around the periphery thereof and including an outer wall 403 formed integral with an inwardly extending horizontal wall 404 that is integral with a vertical extending base flange 412 (see FIG. 26 also). A reinforcing flange 414 is formed integral with and extends inwardly with respect to the base flange 412, all of the parts being supported by the base flange 412. Resting upon the horizontal wall 404 is a bottom wall 420 which has formed around the periphery thereof an upstanding wall 405 that is spaced from the outer wall 403 a distance to accommodate the side panels 424 therebetween along one pair of opposed sides and the door frames 430 along another pair of opposed sides. In order to reinforce the bottom wall 420, a channel 411 is mounted on the lower side thereof, a plurality of the channels 411 being provided if desired. On the upper surface of the wall panel 420 there is provided a pair of shorter upwardly opening channels 421 adapted to receive the lower edges of the divider panels 476 and 478 therein and a longer upwardly opening channel 422 adapted to receive the lower edge of the divider panel 477 therein. Formed in the bottom panel 420 between the ends of the channel 422 and the adjacent ends of the channels 421 are two pairs of slots 418 to receive the mounting tongues 489 of the uprights 485 therein. There also is provided in the inner wall 405 along the portions thereof adjacent to the door frames 430 notches 423 that receive a reinforcing channel on the door frames 430.

The door frames 430 are identical in construction to the door frame 330 described above and, accordingly, like reference numerals in the "400" series have been utilized to designate like parts thereof. The side panels 424, the sliding doors 426 and the front panels 495 are identical to the corresponding parts described above including the side panels 324, the sliding doors 326 and the front panel 395, respectively, and, accordingly, like reference numerals in the "400" series have been utilized to designate like parts in FIGS. 25 to 27. The divider panels 476, 477 and 478 and the uprights 485 are identical in construction to the divider panels 176, 177 and 178 and the uprights 185, respectively, described above, and therefore like reference numerals in the "400" series have been utilized to designate like parts thereof.

The upper edges of the side panels 424, of the door frames 430, of the divider panels 476, 477 and 478 and of the front panels 495 are held in position by and are interconnected by the top frame or counter top 450, the counter top 450 being of the well top type. The counter top 450 is generally rectangular in shape (see FIG. 25) and includes a top panel or counter 454 that is generally imperforate and has dimensions to fit within the area bounded by the side panels 424 and the front panels 495. Extending around the top panel 454 and upwardly therefrom is a wall 455 extending completely therearound and disposed perpendicular thereto and having substantial height to provide a well top, the upper edge of the wall 455 having an outturned flange 456 thereon and extending completely therearound and provided with a downwardly extending reinforcing flange 457, the flange 456 resting upon the upper edges of the side panels 424 and the top panels 495 when the parts are assembled. A divider 496 is provided in the counter top 450, the divider including two vertical walls 497 joined at the upper end by a web 498, the divider 496 serving also to reinforce the counter top 450 as well as to divide the surface of the top panel 454 into two substantially equal halves. There is provided on the underside of the top panel 454 a plurality of channels 451 arranged in alignment and adapted to be disposed over the channels 421 and 422, the channels 451 opening downwardly and receiving the upper edges of the divider panels 476, 477 and 478 therein. If desired a reinforcing member such as the reinforcing member 358 in FIG. 21 can be provided around the upper edge of the counter top 450.

In order to acommodate the uprights 485, the counter top 450 is provided with two apertures 499 therein through the divider 496 and particularly the web 498 thereof, the tongues 489 and the uprights 485 being received in the slots 418 in the bottom panel 420.

The counter unit 400 is assembled by placing the base frame 401 on a suitable support surface as is illustrated in FIG. 27 of the drawings, it being noted that the bottom panel 420 is integral with the base frame 401. Next the side panels 424 and the door frames 430 are placed in the appropriate channels 402, the reinforcing channel 444 on each of the door frames 430 being received in a corresponding slot 423 in the wall 405. Thereafter the sliding doors 426 can be inserted in the door frames 430, the front panels 495 can be positioned on the door frames 430, the divider panels 476 and 478 are placed in the channels 421 and the divider 477 is placed in the channel 422. The counter top 450 is then lowered into operative position, the upper edges of the side panels 424, the door frames 430, the divider panels 476, 477 and 478 and the front panels 495 being received in downwardly facing channels on the counter top 450. If above-the-counter shelves are to be provided in the counter unit 400, then the uprights 485 are inserted through the openings 499 in the counter top 450 and the tongues 489 thereof placed in the slots 418. It will be seen that the assembly of the display unit 450 has been accomplished without the use of any tools, fixtures, jigs or the like or the use of any kind of fastener whatsoever. The parts can be readily disassembled by reversing the described procedure for assembly and after disassembly the parts can be stored in a compact form or easily packed for ready shipment. The materials of construction for the counter unit 400 may be the same as those of the counter unit 100 described above.

Figure 31:
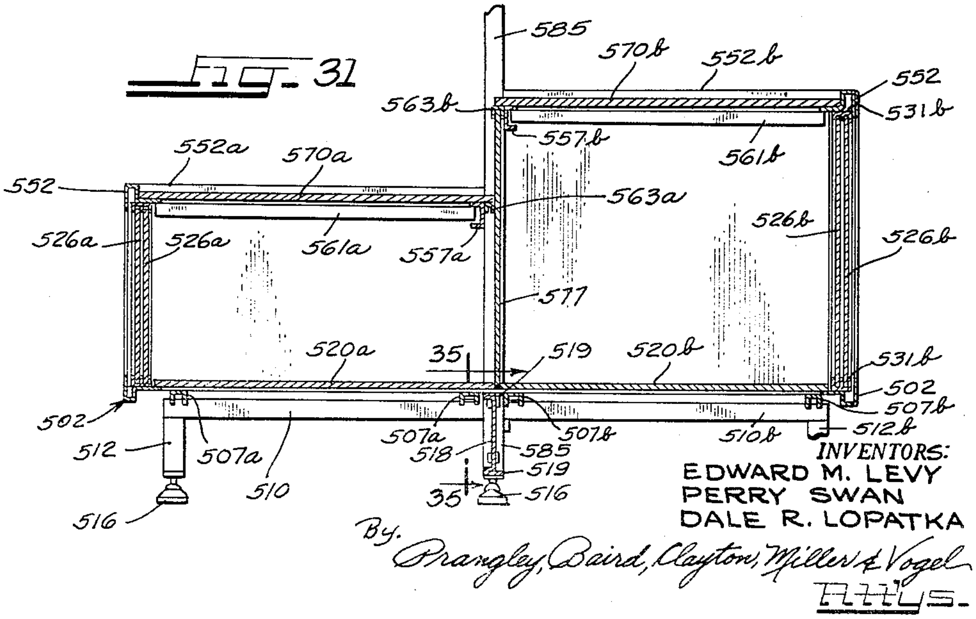
FIG. 31 is a fragmentary view in vertical section as seen along the line 31—31 of FIG. 28.
Figure 32:
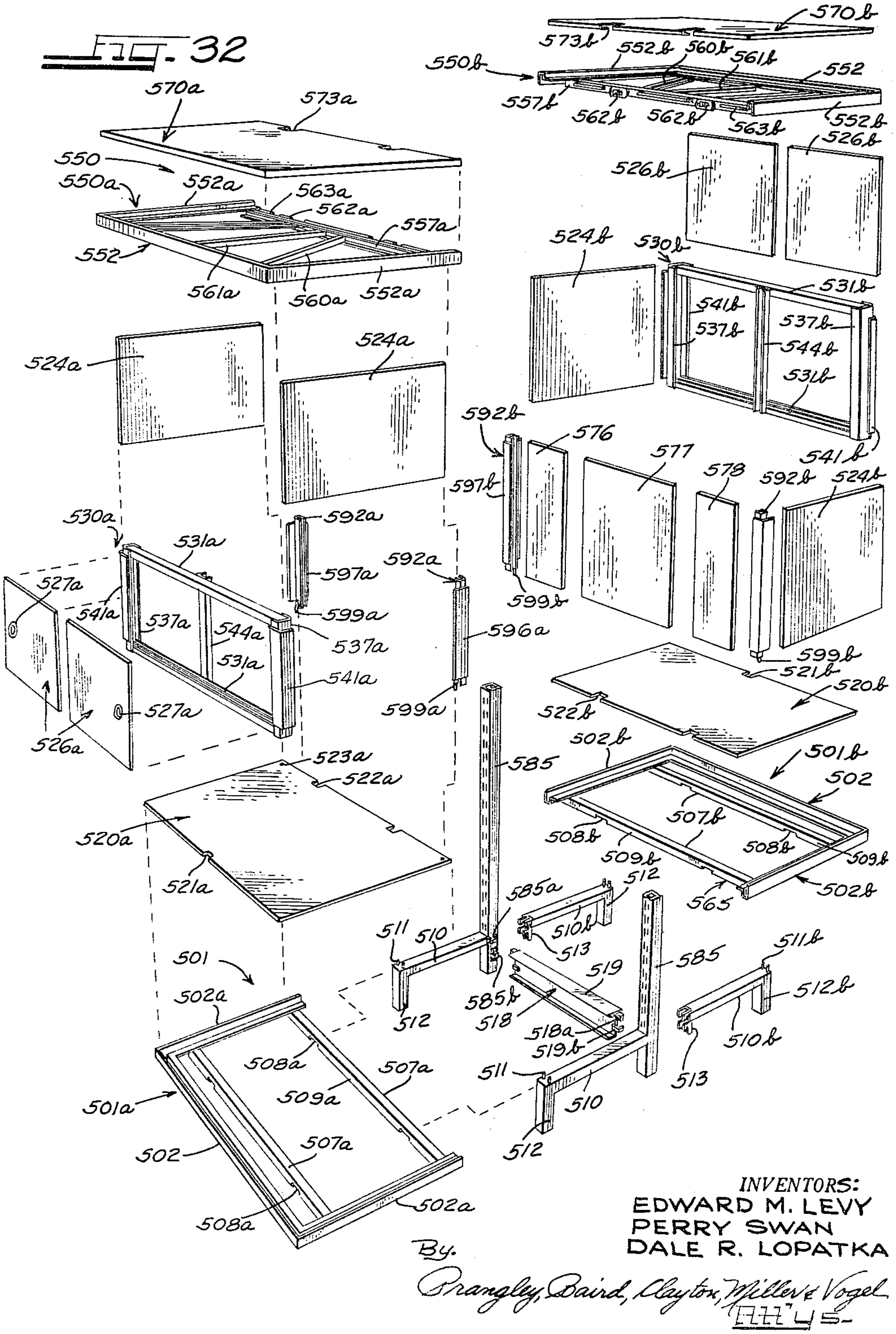
FIG. 32 is an exploded view in perspective of the parts of the counter unit of FIG. 28.

Referring to FIGS. 28 to 39 of the drawings, there is shown a fifth embodiment of the present invention in the form of a counter unit 500 which is provided with a stepped counter as well as above-the-counter shelves. Referring to FIG. 32 of the drawings, it will be seen that the counter unit 500 comprises generally a multi-section base frame 501, two bottom panels 520*a* and 520*b*, two sets of side panels 524*a* and 524*b*, two sets of sliding doors 526*a* and 526*b* received in two door frames 530*a* and 530*b*, respectively, a multi-section top frame including frame sections 550*a* and 550*b*, top panels 570*a* and 570*b*, three divider panels 576, 577 and 578 and four corner members 592*a* and 592*b*.

The multi-section base frame 501 includes two uprights 585 which are generally similar in construction to the uprights 185 described above, each of the uprights 585 being generally rectangular in cross section and having two substantially imperforate side walls 586 and a pair of opposed walls 587 provided with aligned pairs of slots 588 therein. Fixedly secured to each upright 585 adjacent to the lower end thereof is a horizontal frame member 510 which is also square in cross section and substantially imperforate and terminating in a downturned leg 512, there being abutment members 511 on the upper surface of the frame member 510 above the associated leg 512. A second frame member 510*b* is provided for each upright 585, the frame member 510*b* being square in cross section and similar to the frame member 510 and being provided with a hook portion 513 adapted to engage in adjacent pairs of slots 588 in the upright 585 to form a connection therewith. The other end of the frame member 510*b* is provided with a depending leg 512*b* formed integral therewith, the frame member 510*b* also having abutment pins 511*b* on the supper surface thereof above the leg 512*b*. Means is provided to interconnect the uprights 585 in the form of a base bridge or frame member 518 which includes a generally vertically disposed web having a pair of reinforcing flanges 519 formed on the upper and lower edges thereof. A first hook 518*a* is provided on the flange 519 and is adapted to engage in a socket 585*a* formed on the adjacent side of the upright 585, there being a hook 518*a* on each end of the upper flange 519 engaging a socket 585*a* on an upright 585. A second hook 519*a* is attached to the web of the frame member 518 and engages in a socket 585*b* provided on the upright 585 below the socket 585*a*. The hooks 518*a* and 519*a* in cooperation with the associated sockets 585*a* and 585*b* firmly interconnect the uprights 585 and the associated frame member 518.

Figures 33, 34, 35, 36, 37, 38, 39:
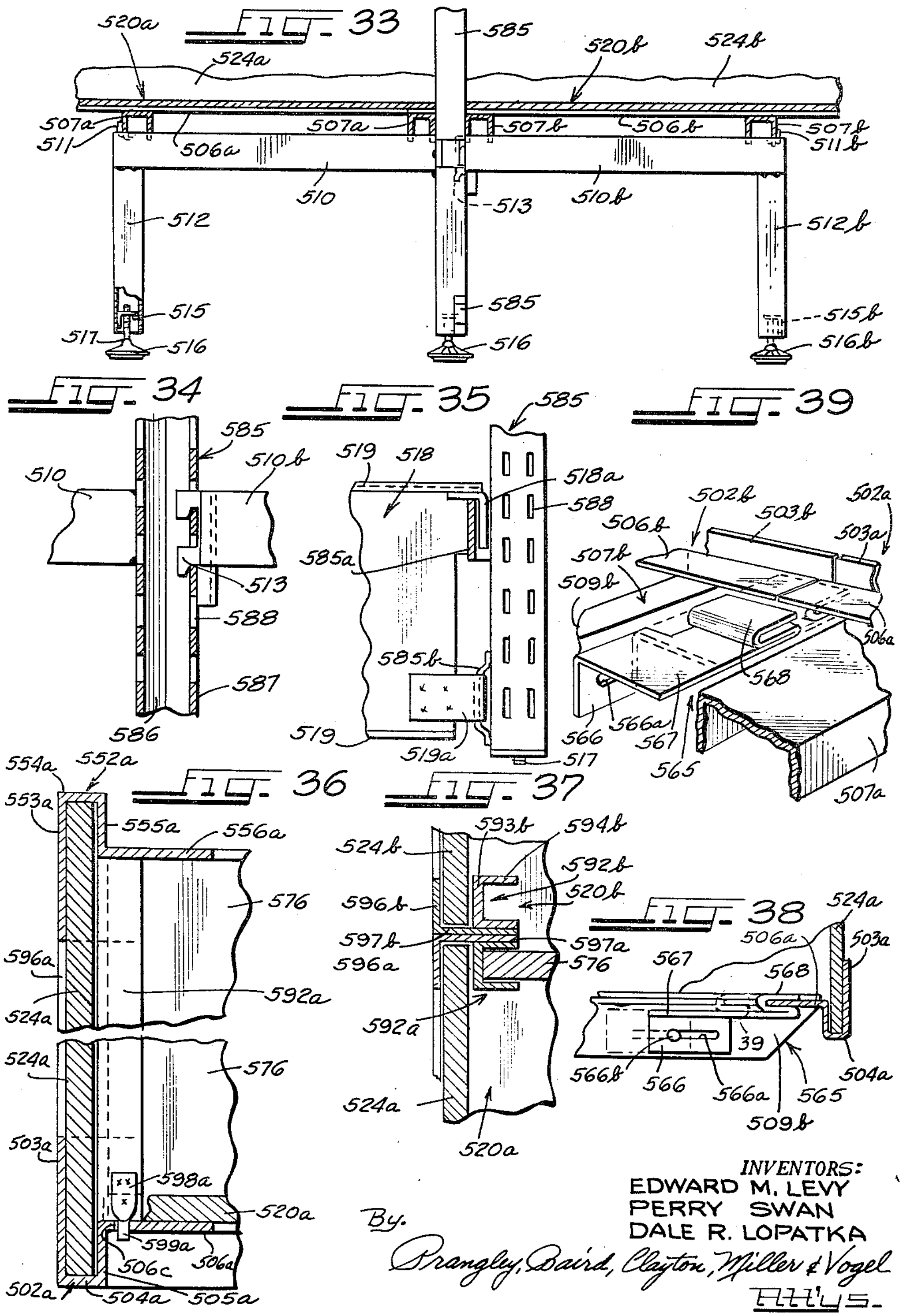
FIG. 33 is a fragmentary view partly in vertical section as seen along the line 33—33 of FIG. 30.
FIG. 34 is an enlarged fragmentary view in vertical section as seen along the line 34—34 of FIG. 30 and illustrating the interconnection of the base frame members.
FIG. 35 is an enlarged fragmentary view in vertical section as seen along the line 35—35 of FIG. 31.
FIG. 36 is an enlarged fragmentary view in vertical section with certain portions broken away as seen along the line 36—36 of FIG. 30.
FIG. 37 is an enlarged fragmentary view in horizontal section as seen along the line 37—37 of FIG. 29.
FIG. 38 is an enlarged view of the structure within the circle 38 in FIG. 29.
FIG. 39 is a perspective view of certain of the parts of the locking mechanism illustrated in FIG. 38.

The base frame 501 also includes two sub-frames 501*a* and 501*b*, the sub-frame 501*a* including a channel member 502 having two shorter channels 502*a* formed integral therewith and disposed perpendicular thereto, the outer ends of the channels 502*a* being interconnected by a reinforcing cross bar 507*a*. The cross section of a typical channel 502*a* is shown in FIG. 36 of the drawings wherein it will be seen that an outer vertical wall 503*a* is provided and is joined at its lower end to an inner vertical wall 505*a* by a bottom wall 504*a*, the walls 503*a* and 505*a* being spaced apart a distance to receive a side panel 524*a* therebetween. The upper edge of the inner wall 505*a* has a flange 506*a* formed thereon and extending inwardly with respect thereto. The sub-frame 501*a* is received upon the frame members 510 and to this end each of the cross bars 507*a* has sets of notches 508*a* to fit over the frame members 510, the pins 511 engaging against the outer leg of the cross bar 507*a* disposed to the left as viewed in FIG. 32. A second sub-frame 501*b* substantially identical to the first sub-frame 501*a* is provided, the sub-frame 501*b* including a channel 502 having channels 502*b* formed integral therewith and interconnected by reinforcing cross bars 507*b* that are substantially identical in construction to the channels 502*a* and the cross bars 507*a*, respectively, described above. The second sub-frame 501*b* is adapted to be received on the frame members 510*b* and to this end the cross bars 507*b* have been provided with notches 508*b* that receive the frame members 510*b* therein, the pins 511*b* engaging the outer wall of the cross bar 507*b* disposed to the right as viewed in FIG. 32.

Referring to FIGS. 38 and 39 of the drawings, there is shown a structure for interconnecting the channels 502*a* and 502*b*, the locking mechanism being generally designated by the numeral 565. The locking mechanism 565 is mounted upon the flange 509*b* disposed nearest the uprights 585 and includes a mounting plate 566 having a horizontally aligned slot 566*a* formed therein and receiving a pin 566*b* therethrough to mount the plate 566 for sliding movement upon the flange 509*b*. Formed integral with the flange 566 and disposed perpendicular thereto is a flange 567 having a substantial width as can be best seen in FIG. 39 and carrying on the outer end thereof a U-shaped clamping piece 568. The clamping piece 568 is adapted to engage about the juncture between the two channel sections 502*a* and 502*b* to support these channel sections at these points and to maintain them in an aligned condition, the clamping member 568 being shown in the engaged position in solid lines in FIG. 38 and being shown in the retracted position in solid lines in FIG. 39. It will be understood that a locking mechanism 565 will be provided on each side of the base frame 501 to interconnect and align the channel sections 502*a* and 502*b*.

The bottom panels 520*a* and 520*b* are substantially rectangular in shape and fit with the sub-frames 501*a* and 501*b* and are provided with notches 521*a* and 521*b*, respectively, to receive a reinforcing channel on the associated door frames 530*a* and 530*b* and two pairs of notches 522*a* and 522*b* to receive the uprights 525 therethrough. The sliding doors 526*a* and 526*b* are substantially identical to the sliding doors 126 described above, the doors 526*b* being substantially higher than the doors 526*a*. The door frame 530*a* is substantially identical to the door frame 130 described above and, accordingly, the description will not be repeated, "500" series numbers being applied to like parts plus the addition of the suffix "*a*." The door frame 530*b* is likewise identical in construction to the door frame 130 described above, numerals from the "500" series being utilized to identify like parts with the addition of the suffix "*b*," the door frame 530*b* being substantially higher than the door frame 530*a* but otherwise having substantially the same construction.

The side panels 524*a* have a height corresponding to the door frame 530*a* and are also provided with corner members 592*a*, the construction of the corner members 592*a* being shown in FIG. 37 of the drawings in which it will be seen that these corner members are identical in construction to the corner members 292 described above and, therefore, like reference numerals in the "500" series with the suffix "*a*" added thereto have been utilized for like parts. The only addition is the provision of a mounting member 598*a* including a pin 597*a* adapted to be received in an opening 506*c* in the flange 506*a* (see FIG. 36) to mount the corner member 592*a* in a vertical position. The corner members 592*b* are identical in construction to the corner members 592*a* but are substantially higher to match the height of the door frame 530*b* and, accordingly, the same reference numerals have been applied to the corner members 592*b* as were applied to the corner member 592*a* with the substitution of the suffix "*b*" for the suffix "*a*."

The side panels 524*b* are like the side panels 524*a* but have a greater height to match the door frame 524*b* and each of the panels 576, 577 and 578 has a height to correspond to the side panels 524*b*, the corner members 592*b* interconnecting the side panels 524*b* and the adjacent divider panels 576 and 578.

Figures 28, 29:
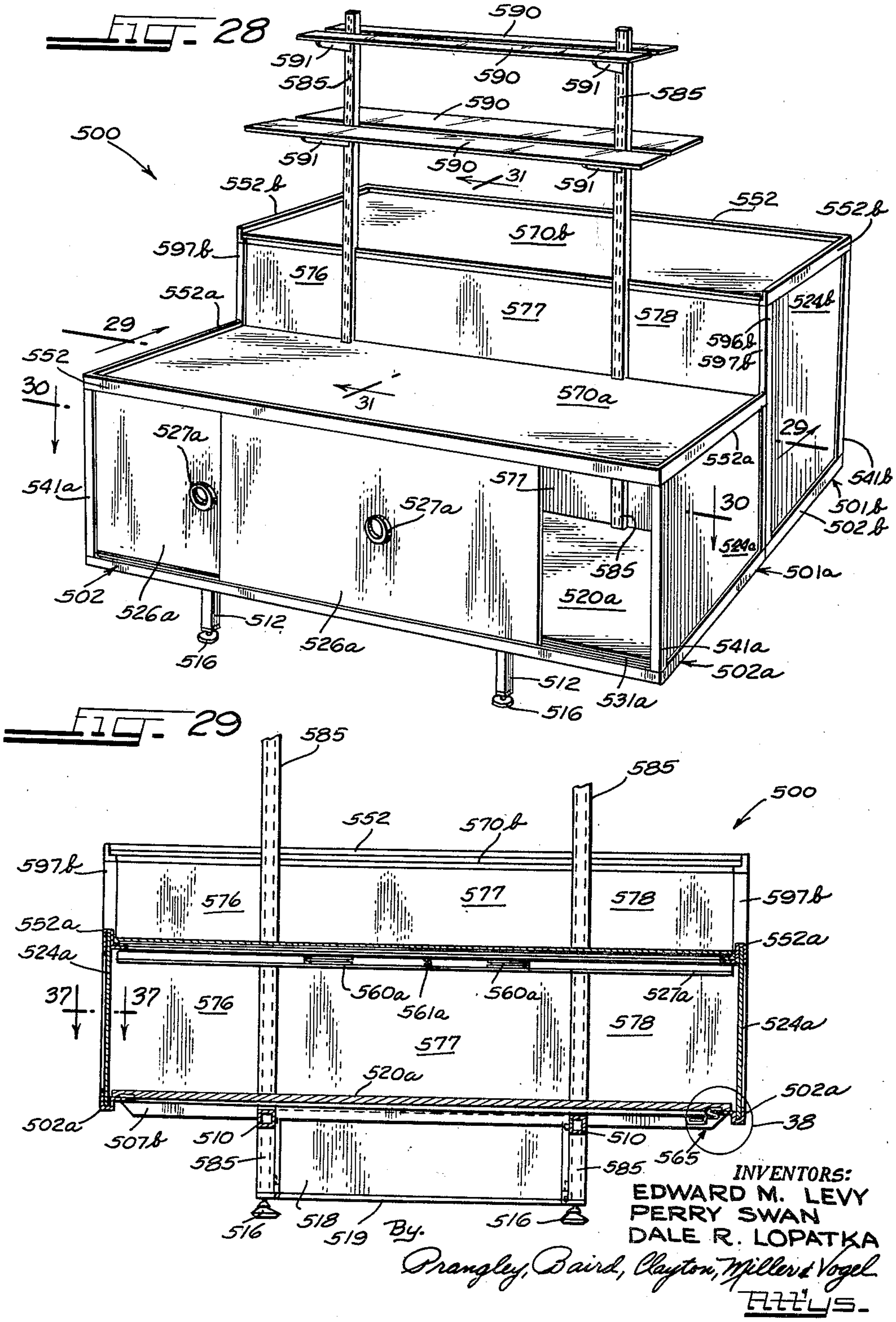
FIG. 28 is a perspective view of a fifth preferred embodiment of the invention and illustrating the application of the principles thereof to a stepped counter top unit.
FIG. 29 is a view in vertical section through the counter unit of FIG. 28 as seen along the line 29—29 thereof.
Figure 30:
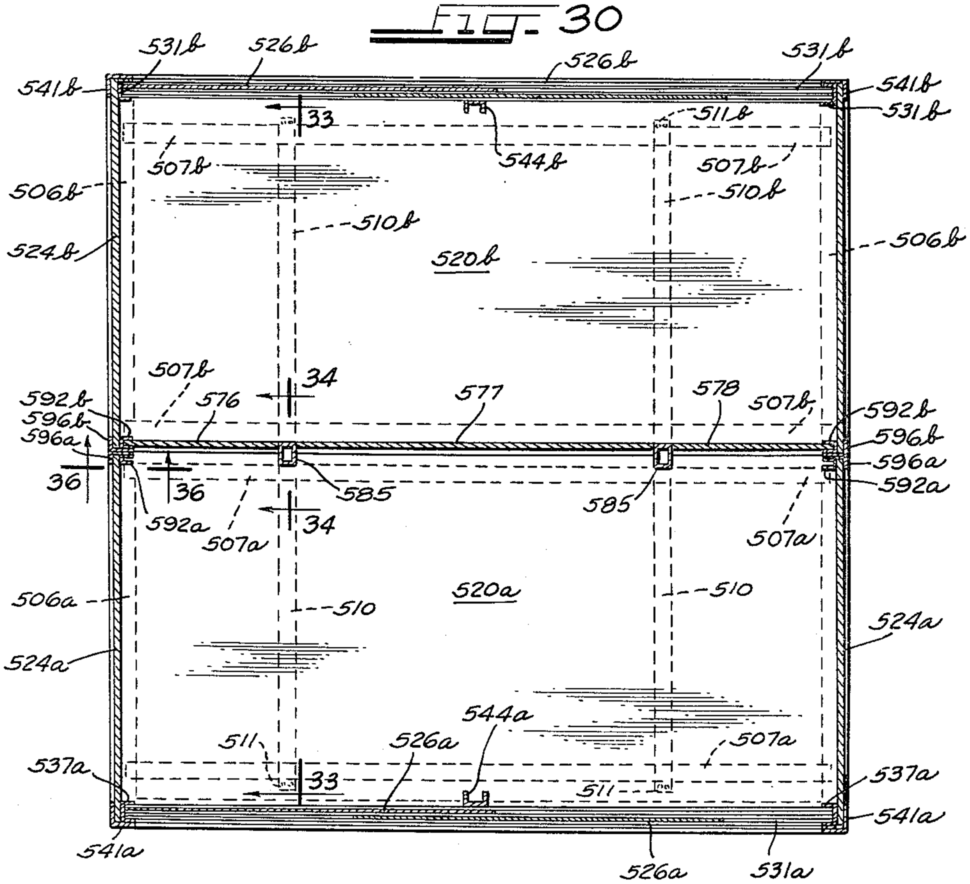
FIG. 30 is a view in horizontal section through the counter unit of FIG. 28 as seen along the line 30—30 thereof.

The top frame 550 includes two frame sections 550*a* and 550*b* which in use are displaced vertically with respect to each other as may be best seen in FIG. 28 of the drawings. The frame sections 550*a* and 550*b* are identical in construction and, accordingly, only the description of the frame section 550*a* will be given in detail, the like parts in the frame section 550*b* being given like numerals with the suffix "*b*" substituted for the suffix "*a*." Referring to FIG. 32 of the drawings it will be seen that the frame section 550*a* is generally rectangular in outline and is provided with a first channel 552 extending the entire width thereof and connected at the ends thereof with two shorter channels 552*a*. Referring to FIG. 36 it will be seen that the channels 552*a* include an outer depending wall 553*a* connected by a web 554*a* to an inner depending wall 555*a*, the lower edge of the inner wall 555*a* having an inwardly directed flange 556*a* thereon. A cross bar 557*a* extends between the outer ends of the channels 552*a* and is provided with a channel 563*a* across the forward face thereof, the channel 563*a* being interrupted at two points to receive the uprights 585 therethrough and to accommodate a locking hook structure 562*a* that is adapted to engage in slots 588 in an upright 585. Reinforcement for the top frame section 550*a* is provided by a pair of angularly disposed channels 560*a* interconnecting the channel 552 and the cross bar 557*a* and a third channel 561*a* interconnecting and disposed perpendicular to the channel 552 and the cross bar 557*a*. As has been pointed out above, the top frame section 550*b* is identical to the top frame section 550*a* and like reference numerals have been applied thereo with the substitution of the suffix "*b*" for the suffix "*a*."

The top panels 570*a* and 570*b* are identical in construction and are also identical in construction to the top panels 170 described above and therefore like reference numerals in the "500" series have been applied thereto, the suffix "*a*" being applied to the parts of the top panel 570 and the suffix "*b*" being applied to the parts of the top panel 570.

In assembling the counter unit 500, the uprights 585 first have the glides 516 applied thereto after which the frame member 518 is assembled to the uprights 585 as illustrated in FIG. 35 thereby to connect the uprights 585. The hook connectors 513 on the frame members 510*b* are then interconnected after which the base frame section 502*a* is mounted on the frame members 510, the pins 511 being positioned against the outer flange of the outer cross bar 507*a* (see FIG. 30), the notches 508*a* receiving the frame members 510 therein thus firmly to mount the base frame section 502*a* thereon. The base frame section 501*b* is then mounted on the frame members 510*b* by placing the frame members 510*b* in the notches 508*b*, the pins 511*b* being disposed against the outer flange of the outer cross bar 507*b* (see FIG. 30) after which the locking mechanism 565 (see FIGS. 38 and 39) is operated to insure that the channels 502*a* and 502*b* are in alignment.

The door frames 530*a* and 530*b* are then mounted in the associated channels 502 and the bottom panels 520*a* and 520*b* inserted in place. Next the corner members 592*a* and 592*b* are mounted in operative position by placing the pins 599*a* and 599*b* in the appropriate apertures in the flanges 506*a* and 506*b* (see FIGS. 36 and 37). The side walls 524*a* and 524*b* and the divider panels 576, 577 and 578 can then be mounted in the vertical position along the channels 502*a* and 502*b* After this the top frame section 550*a* is placed in operative position thereby to interconnect the door frame 530*a* and the side panels 524*a* and the corner members 592*a* by receiving the upper edges thereof in the channels 552*a*, it being noted from FIG. 31 of the drawings that the channels 563*a* are not utilized in this instance. Next the top frame section 550*b* is placed in operative position by receiving the upper edges of the door frame 530*b*, the side panels 524*b* and the corner members 592*b* in the channels 552*b* thereof. Referring to FIG. 31, it will be seen that the upper edges of the divider panels 576, 577 and 578 are received in the channels 563*b*, the lower edges of these divider panels 576, 577 and 578 being disposed between the bottom panels 520*a* and 520*b*. The assembly of the display unit 500 is completed by placing the sliding doors 526*a* and 526*b* and the top panels 570*a* and 570*b* in operative position and adding the support brackets 591 and the above-the-counter shelves 590 (see FIG. 28).

By reference to FIG. 32 it will be seen that all of the parts of the counter unit 500 when disassembled are relatively flat so that they can be easily packaged for storage or shipment. Assembly of the parts to provide the completed counter unit 500 can be readily accomplished without the use of any tools, jigs or fixtures and without the use of any fasteners. Yet the counter unit 500 when assembled is sturdy and is most effective as a display structure.

It will be seen that there have been provided counter units which fulfill all of the objects and advantages set forth. Although certain preferred embodiments of the invention have been shown in the drawings and described for purposes of illustration, it is to be understood that various changes and modifications can be made therein, and it is intended to cover in the appended claims all such modifications and changes that fall within the true spirit and scope of the invention.

What is claimed is:

1. A knockdown counter unit comprising a base frame including an upwardly opening channel extending along each side thereof, a support flange on at least certain of said base frame channels and extending inwardly therefrom, a bottom panel supported by said base support flanges and substantially closing the bottom of said counter unit for receiving articles to be stored thereon, a door frame supported by one of said base support flanges, a door mounted in said door frame and adapted to close the area bounded thereby, rectangular side panels mounted on said base frame and having the lower edges thereof disposed in said base frame channels and supported thereby, a top frame having the same general outline as said base frame and including a downwardly opening channel extending along each side thereof and receiving the upper edges of said side panels therein, a support flange on at least certain of said top frame channels and extending inwardly therefrom, and a top panel supported by said top support flanges and substantially closing the top of said counter unit for receiving articles to be displayed thereon, all of the parts of said counter unit interfitting to form a self-supporting structure requiring no additional fastening members for assembly and use.

2. A knockdown counter unit comprising a base frame including an upwardly opening channel extending along each side thereof, a support flange on at least certain of said base frame channels and extending inwardly therefrom, a bottom panel supported by said base support flanges and substantially closing the bottom of said counter unit for receiving articles to be stored thereon, a door frame supported by one of said base support flanges and including upper and lower parallel channels, two sliding doors mounted respectively in aligned pairs of said upper and lower door frame channels and adapted to close the area bounded by said door frame, rectangular side panels mounted on said base frame and having the lower edges thereof disposed in said base frame channels and supported thereby, a top frame having the same general outline as said base frame and including a downwardly opening channel extending along each side thereof and receiving the upper edges of said side panels therein, a support flange on at least certain of said top frame channels and extending inwardly therefrom, and a top panel supported by said top support flanges and substantially closing the top of said counter unit for receiving articles to be displayed thereon, all of the parts of said counter unit interfitting to form a self-supporting structure requiring no additional fastening members for assembly and use.

3. A knockdown counter unit comprising a base frame including an upwardly opening channel extending along each side thereof, a support flange on at least certain of said base frame channels and extending inwardly therefrom, a bottom panel supported by said base support flanges and substantially closing the bottom of said counter unit for receiving articles to be stored thereon, a door frame supported by one of said base support flanges and including upper and lower parallel channels, two channels respectively disposed in said lower door frame channels and having the webs thereof disposed upwardly to provide tracks, two doors mounted respectively upon said tracks and having the upper edges thereof disposed respectively in said upper door frame channels and adapted to close the area bounded by said door frame, rectangular side panels mounted on said base frame and having the lower edges thereof disposed in said base frame channels and supported thereby, a top frame having the same general outline as said base frame and including a downwardly opening channel extending along each side thereof and receiving the upper edges of said side panels therein, a support flange on at least certain of said top frame channels and extending inwardly therefrom, and a top panel supported by said top support flanges and substantially closing the top of said counter unit for receiving articles to be displayed thereon, all of the parts of said counter unit interfitting to form a self-supporting structure requiring no additional fastening members for assembly and use.

4. A knockdown counter unit comprising a base frame including an upwardly opening channel extending along each side thereof, a support flange on at least certain of said base frame channels and extending inwardly therefrom, a bottom panel supported by said base support flanges and substantially closing the bottom of said counter unit for receiving articles to be stored thereon, two door frames supported respectively by opposed ones of said base support flanges, doors mounted in said door frames and adapted to close the area bounded thereby, rectangular side panels mounted on said base frame and having the lower edges thereof disposed in said base frame channels and supported thereby, a top frame having the same general outline as said base frame and including a downwardly opening channel extending along each side thereof and receiving the upper edges of said side panels therein, a support flange on at least certain of said top frame channels and extending inwardly therefrom, and a top panel supported by said top support flanges and substantially closing the top of said counter unit for receiving articles to be displayed thereon, all of the parts of said counter unit interfitting to form a self-supporting structure requiring no additional fastening members for assembly and use.

5. A knockdown counter unit comprising a base frame including an upwardly opening channel extending along each side thereof, a support flange on at least certain of said base frame channels and extending inwardly therefrom, a cross bar interconnecting opposed ones of said base frame channels, two bottom panels supported by said base support flanges and substantially closing the bottom of said counter unit for receiving articles to be stored thereon and having the adjacent edges thereof disposed above said cross bar, two door frames supported respectively by opposed ones of said base support flanges, doors mounted in said door frames and adapted to close the area bounded thereby, rectangular side panels mounted on said base frame and having the lower edges thereof disposed in said base frame channels and supported thereby, divider panels mounted on said cross bar and extending upwardly between said bottom panels to divide the area bounded by said base frame into two parts, a top frame having the same general outline as said base frame and including downwardly opening channels extending along each side thereof and between opposed sides thereof and receiving the upper edges of said side panels and said divider panels therein, a support flange on at least certain of said top frame channels and extending inwardly therefrom, and two top panels supported by said said top support flanges and substantially closing the top of said counter unit for receiving articles to be displayed thereon, all of the parts of said counter unit interfitting to form a self-supporting structure requiring no additional fastening members for assembly and use.

6. A knockdown counter unit comprising a base frame including an upwardly opening channel extending along each side thereof and having a support flange on certain of said channels directed inwardly thereof, a bottom panel supported by said base support flange and providing a base deck for said counter unit, rectangular side panels mounted on said base frame and having the lower edges thereof disposed in said base frame channels and supported thereby, a door frame supported by one of said base support flanges and having vertically extending connecting channels on each end thereof receiving the adjacent vertical edges of the adjacent side panels therein, a door mounted in said door frame and adapted to close the area bounded thereby, a top frame having the same general outline as said base frame and including a downwardly opening channel extending along each side thereof and having a support flange on certain of said channels directed inwardly thereof, said top frame channels receiving the upper edges of said side panels therein, and a top panel supported by said top frame support flanges and substantially closing the top of said counter unit for receiving articles to be displayed thereon, all of the parts of said counter unit interfitting to form a self-supporting structure requiring no additional fastening members for assembly and use.

7. A knockdown counter unit comprising a base frame including an upwardly opening channel extending along each side thereof and having a support flange on certain of said channels directed inwardly thereof, a bottom panel supported by said base frame support flange and providing a base deck for said counter unit, rectangular side panels mounted on said base frame and having the lower edges thereof disposed in said base frame channels and supported thereby, two door frames supported respectively by opposed ones of said base support flanges and each having vertically extending connecting channels on each end thereof receiving the adjacent vertical edges of the adjacent side panels therein, doors mounted in said door frames and adapted to close the area bounded thereby, a top frame having the same general outline as said base frame and including a downwardly opening channel extending along each side thereof and having a support flange on certain of said channels directed inwardly thereof, said top frame channels receiving the upper edges of said side panels therein, and a top panel supported by said top frame support flanges and substantially closing the top of said counter unit for receiving articles to be displayed thereon, all of the parts of said counter unit interfitting to form a self-supporting structure requiring no additional fastening members for assembly and use.

8. A knockdown counter unit comprising a base frame including an upwardly opening channel extending along each side thereof and having a support flange on certain of said channels directed inwardly thereof, a cross bar interconnecting opposed ones of said base frame channels, two bottom panels supported by said base support flanges and substantially closing the bottom of said counter unit for receiving articles to be stored thereon and having the adjacent edges thereof disposed above said cross bar, rectangular side panels mounted on said base frame and having the lower edges thereof disposed in said base frame channels and supported thereby, two door frames supported respectively by opposed ones of said base support flanges and each having vertically extending connecting channels on each end thereof receiving the adjacent vertical edges of the adjacent side panels therein, doors mounted in said door frames and adapted to close the area bounded thereby, divider panels mounted on said cross bar and extending upwardly between said bottom panels to divide the area bounded by said base frame into two parts, a top frame having the same general outline as said base frame and including downwardly opening channels extending along each side thereof and between opposed sides thereof and receiving the upper edges of said side panels and said divider panels therein, a support flange on at least certain of said top frame channels and extending inwardly therefrom, and two top panels supported by said top support flanges and substantially closing the top of said counter unit for receiving articles to be displayed thereon, all of the parts of said counter unit interfitting to form a self-supporting structure requiring no additional fastening members for assembly and use.

9. A knockdown counter unit comprising a base frame including and upwardly opening channel extending along each side thereof, a support flange on at least certain of said base frame channels and extending inwardly therefrom, a cross bar interconnecting opposed ones of said base frame channels, two bottom panels supported by said base support flanges and substantially closing the bottom of said counter unit for receiving articles to be stored thereon and having the adjacent edges thereof disposed above said cross bar, two door frames supported respectively by opposed ones of said base support flanges, doors mounted in said door frames and adapted to close the area bounded thereby, rectangular side panels mounted on said base frame and having the lower edges thereof disposed in said base frame channels and supported thereby, divider panels mounted on said cross bar and extending upwardly between said bottom panels to divide the area bounded by said base frame into two parts, a top frame having the same general outline as said base frame and including downwardly opening channels extending along each side thereof and between opposed sides thereof and receiving the upper edges of said side panels and said divider panels therein a support flange on at least certain of said top frame channels and extending inwardly therefrom, two top panels supported by said top support flanges and substantially closing the top of said counter unit for receiving articles to be displayed thereon, a pair of uprights mounted on said cross bar and extending upwardly through said top panel, and a shelf mounted on said uprights and overlying said top panel, all of the parts of said counter unit interfitting to form a self-supporting structure requiring no additional fastening members for assembly and use.

10. A knockdown counter unit comprising a base frame including an upwardly opening channel extending along each side thereof and having a support flange on certain of said channels directed inwardly thereof, a bottom panel supported by said base frame support flange and providing a base deck for said counter unit, rectangular side panels mounted on said base frame and having the lower edges thereof disposed in said base frame channels and supported thereby, a door frame supported by one of said base support flanges and having vertically extending connecting channels on each end thereof receiving the adjacent vertical edges of the adjacent side panels therein, a door mounted in said door frame and adapted to close the area bounded thereby, a top frame having the same general outline as said base frame and including a downwardly opening channel extending along each side thereof and having a support flange on certain of said channels directed inwardly thereof, said top frame channels receiving the upper edges of said side panels therein, a top panel supported by said top frame support flanges and substantially closing the top of said counter unit for receiving articles to be displayed thereon, an upright mounted on the base support flange opposite said door frame and extending upwardly above said top frame, and a shelf mounted on said uprights and being disposed above and overlying said top panel, all of the parts of said counter unit interfitting to form a self-supporting structure requiring no additional fastening members for assembly and use.

11. A knockdown counter unit comprising a base frame including an upwardly opening channel extending along each side thereof, rectangular side panels mounted on said base frame and having the lower edges thereof disposed in said base frame channels and supported thereby, a top frame having the same general outline as said base frame and including a downwardly opening channel extending along each side thereof and receiving the upper edges of said side panels therein, a support flange on at least certain of said top frame channels and extending inwardly therefrom, a top panel supported by said top support flanges and substantially closing the top of said counter unit for receiving articles to be displayed thereon, a pair of uprights mounted on said base frame and extending above said top frame, locking mechanism mounted on said top frame for each of said uprights and including a pin insertable through an opening in the associated upright and resiliently urged into the locking position, and a shelf mounted on said uprights and disposed above and overlying said top panel, all of the parts of said counter unit interfitting to form a self-supporting structure requiring no additional fastening members for assembly and use.

12. A knockdown counter unit comprising a base frame including an upwardly opening channel extending along each side thereof, a support flange on at least certain of said base frame channels and extending inwardly therefrom, a cross bar interconnecting opposed ones of said base frame channels, two bottom panels supported by said base support flanges and substantially closing the bottom of said display unit for receiving articles to be stored thereon and having the adjacent edges thereof disposed above said cross bar, two door frames supported respectively by opposed ones of said base support flanges, doors mounted in said door frames and adapted to close the area bounded thereby, rectangular side panels mounted on said base frame and having the lower edges thereof disposed in said base frame channels and supported thereby, divider panels mounted on said cross bar and extending upwardly between said bottom panels to divide the area bounded by said base frame into two parts, a top frame having the same general outline as said base frame and including downwardly opening channels extending along each side thereof and receiving the upper edges of said side panels therein, a cross bar interconnecting opposed ones of said top frame channels, clips engaging said top cross bar and said divider panels to connect said divider panels to said top frame, a support flange on at least certain of said top frame channels and extending inwardly therefrom, and two top panels supported by said top support flanges and substantially closing the top of said counter unit for receiving articles to be displayed thereon, all of the parts of said counter unit interfitting to form a self-supporting structure requiring no additional fastening members for assembly and use.

13. A knockdown counter unit comprising a base frame including an upwardly opening channel extending along each side thereof, a support flange on at least certain of said base frame channels and extending inwardly therefrom, a cross bar interconnecting opposed ones of said base frame channels, two bottom panels supported by said base support flanges and substantially closing the bottom of said counter unit for receiving articles to be stored thereon and having the adjacent edges thereof disposed above said cross bar, two door frames supported respectively by opposed ones of said base support flanges, doors mounted in said door frames and adapted to close the area bounded thereby, rectangular side panels mounted on said base frame and having the lower edges thereof disposed in said base frame channels and supported thereby, divider panels mounted on said cross bar and extending upwardly between said bottom panels to divide the area bounded by said base frame into two parts, a top frame having the same general outline as said base frame and including downwardly opening channels extending along each side thereof and receiving the upper edges of said side panels therein, a support channel rigidly mounted on said top frame and opening downwardly and receiving the upper edges of said divider panels therein, a support flange on at least certain of said top frame channels and extending inwardly therefrom, and two top panels supported by said top support flanges and substantially closing the top of said counter unit for receiving articles to be displayed thereon, all of the parts of said counter unit interfitting to form a self-supporting structure requiring no additional fastening members for assembly and use.

14. A knockdown counter unit comprising an integral one-piece base frame including an upwardly opening channel extending along each side thereof and having a support flange on certain of said support channels and directed inwardly thereof, a bottom panel supported by said base frame support flange and providing a base deck for said counter unit, two rectangular side panels mounted on said base frame and having the lower edges thereof disposed in opposite ones of said base frame channels and supported thereby, an integral one-piece door frame supported by one of said base support flanges and having vertically extending connecting channels on each end thereof receiving the adjacent vertical edges of the side panels therein, a door mounted in said door frame and adapted to close the area bounded thereby, a plurality of back panels supported by the base support flange opposite said door frame and having the lower edges thereof disposed in said base frame channel and supported thereby, two corner members mounted on said base frame and having vertically extending connecting channels thereon to receive the adjacent vertical edges of the adjacent side panel and adjacent rear panel therein, an integral one-piece top frame having the same general outline as said base frame and including a downwardly opening channel extending along each side thereof and having a support flange on certain of said channels directed inwardly thereof, said top frame channels receiving the upper edges of said side panels and said rear panels therein, and a top panel supported by said top frame support flanges and substantially closing the top of said counter unit for receiving articles to be displayed thereon, all of the parts of said counter unit interfitting to form a self-supporting structure requiring no additional fastening members for assembly and use.

15. A knockdown counter unit comprising a base frame including an upwardly opening channel extending along each side thereof, a support flange on at least certain of said base frame channels and extending inwardly therefrom, a bottom panel supported by said base support flanges and substantially closing the bottom of said counter unit for receiving articles to be stored thereon, a door frame supported by one of said base support flanges, a door mounted in said door frame and adapted to close the area bounded thereby, rectangular side panels mounted on said base frame and having the lower edges thereof disposed in said base channels and extending upwardly above said door frame, a front panel mounted on said door frame and having the upper edge thereof disposed at the same height as the upper edge of said side panels, a top frame having the same general outline as said base frame and including a downwardly opening channel extending along each side thereof and receiving the upper edges of said side panels and said front panel therein, a wall on the inner side of said top frame channel extending around the inner periphery thereof and downwardly below the lower edge thereof, and a counter member integral with the lower edge of said wall and substantially closing the top of said counter unit to provide a well top for receiving articles to be displayed thereon, all of the parts of said counter unit interfitting to form a self-supporting structure requiring no additional fastening members for assembly and use.

16. The knockdown counter unit set forth in claim 15, wherein said door frame has a retaining flange on the upper edge thereof extending upwardly along the outer surface of said front panel to hold said front panel in position.

17. A knockdown counter unit comprising a base frame including an upwardly opening channel extending along each edge thereof, a support flange on at least certain of said base frame channels and extending inwardly therefrom, a bottom panel supported by said base support flanges and substantially closing the bottom of said counter unit for receiving articles to be stored thereon, two door frames supported respectively by opposed ones of said base support flanges, doors mounted in said door frames and adapted to close the area bounded thereby, rectangular side panels mounted on said base frame and having the lower edges thereof disposed in said base frame channels and having the upper edges thereof disposed substantially above the upper edges of said door frames, a front panel mounted on the top of each of said door frames and having the upper edge thereof disposed in substantial alignment with the upper edges of said side panels, a top frame having the same general outline as said base frame and including a downwardly opening channel extending along each edge thereof and receiving the upper edges of said side panels and said front panels therein, a wall on the inner periphery of said top frame channel extending therearound and downwardly below said top frame channel, and a counter member integral with the lower edge of said wall and substantially closing the top of said counter unit to provide in combination with said top wall a well top for receiving articles to be displayed thereon, all of the parts of said counter unit interfitting to form a self-supporting structure requiring no additional fastening members for assembly and use.

18. A knockdown counter unit comprising a base frame including an upwardly opening channel extending along each side thereof, a support flange on at least certain of said base frame channels and extending inwardly therefrom, a bottom panel supported by said base support flanges and substantially closing the bottom of said counter unit for receiving articles to be stored thereon, two door frames supported respectively by opposed ones of said base support flanges, doors mounted in said door frames and adapted to close the area bounded thereby, rectangular side panels mounted on said base frame and having the lower edges thereof disposed in said base frame channels and having the upper edges thereof disposed substantially above the upper edges of said door frames, a front panel mounted on the top of each of said door frames and having the upper edge thereof disposed in substantial alignment with the upper edges of said side panels, a top frame having the same general outline as said base frame and including a downwardly opening channel extending along each side thereof and receiving the upper edges of said side panels and said front panels therein, a wall on the inner periphery of said top frame channel extending therearound and downwardly below said top frame channel, and a counter member integral with the lower edge of said wall and substantially closing the top of said counter unit to provide in combination with said top wall a well top for receiving articles to be displayed thereon, a divider interconnecting opposed portions of said wall to divide said well top into two portions, two uprights mounted on said base frame and extending through openings in said divider and upwardly above said top frame, and a shelf mounted on said uprights above and overlying said well top, all of the parts of said counter unit interfitting to form a self-supporting structure requiring no additional fastening members for assembly and use.

19. A knockdown counter unit comprising a generally rectangular base frame including an upstanding base flange having a reinforcing flange extending inwardly from the lower edge thereof and a support flange on the upper edge thereof extending outwardly therefrom and completely therearound, a pair of spaced apart retaining flanges on said support flange extending therealong and defining an upwardly opening channel along each side of said base frame, a base panel integral with the innermost retaining flange and substantially closing the bottom of said counter unit, upwardly opening divider channels mounted on said bottom panel in alignment across substantially the center thereof, rectangular side panels mounted on said base frame and having the lower edges thereof disposed in said base frame channels and supported thereby, divider panels mounted on said base panel in said divider channels and extending upwardly therefrom, a top frame having the same general outline as said base frame and including a downwardly opening channel extending along each side thereof and receiving the upper edges of said side panels therein and downwardly opening divider channels in vertical alignment with said base divider channels and receiving the upper edges of said divider panels therein, a support flange on at least certain of said top frame channels and extending inwardly therefrom, and a top panel supported by said top support flanges and substantially closing the top of said counter unit for receiving articles to be displayed thereon, all of the parts of said counter unit interfitting to form a self-supporting structure requiring no additional fastening members for assembly and use.

20. A knockdown counter unit comprising a base frame including an upwardly opening channel extending along each side thereof, a support flange on at least certain of said base frame channels and extending inwardly therefrom, a bottom panel supported by said base support flanges and substantially closing the bottom of said counter unit for receiving articles to be stored thereon, a first door frame supported by one of said base support flanges, a second door frame supported by the base support flange opposite said first door frame and extending upwardly substantially above said first door frame, a first set of rectangular side panels mounted on said base frame and having the lower edges thereof disposed in said base frame channels and having the upper edges thereof in substantial alignment with the upper edge of said first door frame, a second set of rectangular side panels mounted on said base frame and having the lower edges thereof disposed in said base channels and having the upper edges thereof in substantial alignment with the upper edge of said second door frame, divider panels mounted on said base frame and extending upwardly between said sets of side panels and having the upper edges thereof in general alignment with said second set of said side panels, a first top frame section having the same general outline as the area bounded by said first door frame and said first set of side panels and including a downwardly opening channel extending along each side thereof and receiving the upper edges of said first set of side panels, a first support flange on said first top frame section channel and extending inwardly therefrom, a first top panel supported by said first support flange and substantially closing the horizontal area bounded thereby, a second top frame section having the same general outline as the area bounded by said second door frame and said second set of side panels and including a downwardly opening channel extending along each side thereof and receiving the upper edges of said side panels and said divider panels therein, a second support flange on at least certain of said second top frame channels and extending inwardly therefrom, and a second top panel supported by said second top support flanges and substantially closing the horizontal area bounded thereby, all of the parts of said counter unit interfitting to form a self-supporting structure requiring no additional fastening members for assembly and use.

21. A knockdown counter unit comprising, a base frame including a pair of spaced apart uprights having first frame members integral therewith and extending perpendicularly thereto in one direction, second frame members detachably connected to said uprights and extending perpendicular thereto and away from said uprights in the opposite direction from said first frame members, a first base frame section mounted on said first frame members and including an upwardly opening first channel extending along each of the outer edges thereof, a support flange on at least certain of said first channels and extending inwardly therefrom, a bottom panel supported by said first base frame section support flanges and substantially closing the bottom of said first base frame section for receiving articles to be stored thereon, a second base frame section mounted on said second frame members and including a second upwardly opening channel extending along each of the outer edges thereof, a support flange on at least certain of said second base frame section channels and extending inwardly therefrom, a second bottom panel supported by said second base frame section support flanges and substantially closing the bottom of said second base frame section for receiving articles to be stored thereon, a first door frame supported by one of said base frame section support flanges, a second door frame supported by the base frame section support flange opposite said first door frame and extending upwardly substantially above said first door frame, a first set of rectangular side panels mounted on said base frame and having the lower edges thereof disposed in said base frame channels and having the upper edges thereof in substantial alignment with the upper edge of said first door frame, a second set of rectangular side panels mounted on said base frame and having the lower edges thereof disposed in said base channels and having the upper edges thereof in substantial alignment with the upper edge of said second door frame, divider panels mounted on said base frame and extending upwardly between said sets of side panels and having the upper edges thereof in general alignment with the upper edges of said second set of said side panels, a first top frame section having the same general outline as the horizontal area bounded by said first door frame and said first set of side panels and including a downwardly opening channel extending along each side thereof and receiving the upper edges of said first set of side panels, a support flange on said first top frame section channel and extending inwardly therefrom, a first top panel supported by said first top frame section support flange and substantially closing the horizontal area bounded by said first top frame section, a second top frame section having the same general outline as the horizontal area bounded by said second door frame and said second set of side panels and including a downwardly opening channel extending along each side thereof and receiving the upper edges of said second set of side panels and said divider panels therein, a second support flange on at least certain of said second top frame section channels and extending inwardly therefrom, and a second top panel supported by said second top frame section support flanges and substantially closing the horizontal area bounded thereby, all of the parts of said counter unit interfitting to form a self-supporting structure requiring no additional fastening members for assembly and use.

References Cited by the Examiner

UNITED STATES PATENTS

| | | | |
|---|---|---|---|
| 1,345,366 | 7/20 | Jippson | 312—255 |
| 1,631,620 | 3/53 | Carrigan | 5—11 X |
| 1,846,485 | 2/32 | Hart | 312—114 X |
| 1,980,973 | 11/34 | Alheit | 312—140 X |

(References on following page)

UNITED STATES PATENTS

| | | | |
|---|---|---|---|
| 1,999,605 | 4/35 | Winslow | 189—34 |
| 2,122,098 | 6/38 | Janssen | 312—108 X |
| 2,205,826 | 6/40 | Small | 220—84 |
| 2,295,915 | 9/42 | Ring | 312—257 X |
| 2,463,128 | 3/49 | Vanderveld | |
| 2,542,046 | 2/51 | Mullett | 312—210 |
| 2,572,081 | 10/51 | Wallance | |
| 2,578,644 | 12/51 | Mautner | 220—97 X |
| 2,580,029 | 12/51 | Krauss | 312—140 |
| 2,631,913 | 3/53 | Rosenberg | 312—257 |
| 2,667,401 | 1/54 | Knuth | 312—253 X |
| 2,696,419 | 12/54 | Wallance et al. | 312—257 |
| 2,710,241 | 6/55 | Lieberman | 312—257 |
| 2,729,875 | 1/56 | White | 5—11 X |
| 2,762,672 | 9/56 | Motter | 312—257 X |
| 2,818,192 | 12/57 | Weiner | 220—83 X |
| 2,905,281 | 9/59 | Zitomer | 189—34 |
| 2,968,519 | 1/61 | Weber | 312—257 X |
| 2,971,805 | 2/61 | Weiss | 211—134 |
| 3,009,581 | 11/61 | Stewart | 211—175 |
| 3,032,382 | 5/62 | Jordan | 312—253 |
| 3,069,002 | 12/62 | Hart | 220—4 X |

FOREIGN PATENTS

| | | |
|---|---|---|
| 192,478 | 2/23 | Great Britain. |
| 728,340 | 4/55 | Great Britain. |

FRANK B. SHERRY, *Primary Examiner.*

GEORGE L. BREHM, *Examiner.*